United States Patent
Busayarat et al.

(10) Patent No.: US 10,698,740 B2
(45) Date of Patent: Jun. 30, 2020

(54) VIRTUAL GRAPH NODES

(71) Applicant: Home Box Office, Inc., New York, NY (US)

(72) Inventors: Sata Busayarat, Seattle, WA (US); Jack Song, Shoreline, WA (US); Brandon C. Furtwangler, Issaquah, WA (US); Jonathan David Lutz, Seattle, WA (US); Allen Arthur Gay, Shoreline, WA (US); Steven N. Furtwangler, Okemos, MI (US)

(73) Assignee: HOME BOX OFFICE, INC., New York, NY (US)

( * ) Notice: Subject to any disclaimer, the term of this patent is extended or adjusted under 35 U.S.C. 154(b) by 286 days.

(21) Appl. No.: 15/584,142

(22) Filed: May 2, 2017

(65) Prior Publication Data
US 2018/0321984 A1   Nov. 8, 2018

(51) Int. Cl.
*G06F 16/00*     (2019.01)
*G06F 9/50*      (2006.01)
(Continued)

(52) U.S. Cl.
CPC .......... *G06F 9/5077* (2013.01); *G06F 9/5005* (2013.01); *G06F 16/2457* (2019.01);
(Continued)

(58) Field of Classification Search
CPC .... G06F 16/80; G06F 16/2457; G06F 16/285; G06F 16/278; G06F 16/51; G06F 9/5077;
(Continued)

(56) References Cited

U.S. PATENT DOCUMENTS 6,025,837 A  *  2/2000  Matthews, III .... H04N 5/44543
                                            348/E5.105
7,302,430 B1    11/2007  Nagda et al.
(Continued)

FOREIGN PATENT DOCUMENTS

EP    0 848 554 A2    6/1998
WO    97/13368 A1     4/1997
(Continued)

OTHER PUBLICATIONS

International Search Report and Written Opinion received for International Application Serial No. PCT/US2016/056755 dated Dec. 19, 2016, 15 pages.
(Continued)

*Primary Examiner* — Anh Ly
(74) *Attorney, Agent, or Firm* — Amin, Turocy & Watson, LLP

(57) ABSTRACT

The described technology is directed towards returning less data than is available for a data item in response to a request to a data service. A virtual graph node is returned in response to client requests, in which the virtual node comprises a relatively lightweight set of information relative to the full set of information for the data item, e.g., maintained in a main (graph) node. A requesting client indicates that a virtual node is desired, and receives a response comprising the virtual node, generally processed from the main node's data into a reduced subset of the main node. The main node may be cached at the data service, and returned if and when requested.

21 Claims, 12 Drawing Sheets

(51) Int. Cl.
*G06F 16/51* (2019.01)
*G06F 16/28* (2019.01)
*G06F 16/2457* (2019.01)
*G06F 16/80* (2019.01)

(52) U.S. Cl.
CPC ............ *G06F 16/285* (2019.01); *G06F 16/51* (2019.01); *G06F 16/80* (2019.01)

(58) Field of Classification Search
CPC ........ G06F 9/5005; G06F 16/00; G06F 17/30; G06F 16/338; G06F 16/961; G06F 17/30696; G06F 17/30864; H04L 12/4068; G06T 11/206; G06Q 50/18
See application file for complete search history.

(56) References Cited

U.S. PATENT DOCUMENTS

| | | | |
|---|---|---|---|
| 7,373,459 B2 | 5/2008 | Aoki et al. | |
| 7,620,653 B1 | 11/2009 | Swartz | |
| 7,793,206 B2 | 9/2010 | Lim et al. | |
| 8,725,849 B1 | 5/2014 | Lloyd | |
| 8,849,825 B1 | 9/2014 | McHugh et al. | |
| 9,031,995 B1 | 5/2015 | Raden, II et al. | |
| 9,166,862 B1 | 10/2015 | Davis et al. | |
| 9,294,796 B2 | 3/2016 | McDonough et al. | |
| 9,419,652 B2 | 8/2016 | Heller et al. | |
| 9,817,646 B1 | 11/2017 | Chen et al. | |
| 9,875,262 B2 | 1/2018 | McHugh et al. | |
| 9,887,885 B2 | 2/2018 | Varney et al. | |
| 9,891,938 B2 | 2/2018 | Barry et al. | |
| 9,894,119 B2 | 2/2018 | Pearl et al. | |
| 10,042,626 B2 | 8/2018 | Nekrestyanov et al. | |
| 10,148,762 B2 | 12/2018 | Rogers et al. | |
| 10,277,704 B2 | 4/2019 | Busayarat et al. | |
| 10,320,879 B2 | 6/2019 | Nekrestyanov et al. | |
| 2001/0034771 A1 | 10/2001 | Hutsch et al. | |
| 2002/0143591 A1 | 10/2002 | Connelly | |
| 2003/0037206 A1* | 2/2003 | Benfield ........... G06F 16/24552 711/133 | |
| 2003/0038836 A1* | 2/2003 | Ronald ................. G06F 16/954 715/738 | |
| 2003/0039230 A1 | 2/2003 | Ostman et al. | |
| 2003/0097357 A1* | 5/2003 | Ferrari ................. G06F 16/954 | |
| 2004/0082352 A1 | 4/2004 | Keating et al. | |
| 2004/0098744 A1 | 5/2004 | Gutta | |
| 2004/0139480 A1 | 7/2004 | Delpuch et al. | |
| 2005/0027871 A1* | 2/2005 | Bradley ............... G06F 16/951 709/227 | |
| 2005/0289168 A1* | 12/2005 | Green ................. G06F 16/951 | |
| 2006/0236221 A1 | 10/2006 | McCausland et al. | |
| 2007/0130163 A1* | 6/2007 | Perez ..................... G06Q 10/10 | |
| 2009/0125809 A1 | 5/2009 | Trapani et al. | |
| 2009/0138441 A1 | 5/2009 | Valentine et al. | |
| 2009/0164414 A1* | 6/2009 | Tatzel ................. G06F 16/2455 | |
| 2009/0193044 A1* | 7/2009 | Buehrer ................. G06F 16/95 | |
| 2009/0282432 A1* | 11/2009 | Hahnefeld ......... G06Q 30/0601 725/31 | |
| 2010/0063878 A1 | 3/2010 | Bachet et al. | |
| 2010/0070447 A1 | 3/2010 | Pfuntner et al. | |
| 2010/0257204 A1* | 10/2010 | Orlov ..................... H04L 9/0836 707/783 | |
| 2011/0145327 A1* | 6/2011 | Stewart ................. G06Q 10/10 709/203 | |
| 2011/0246471 A1 | 10/2011 | Rakib | |
| 2011/0289458 A1 | 11/2011 | Yu et al. | |
| 2011/0289533 A1 | 11/2011 | White et al. | |
| 2011/0314326 A1* | 12/2011 | Mahajan ............. G06F 11/2023 714/4.11 | |
| 2012/0197908 A1* | 8/2012 | Unno ................... G06F 17/2745 707/749 | |
| 2012/0215684 A1* | 8/2012 | Kidron ................. G06F 15/167 705/39 | |
| 2013/0024851 A1 | 1/2013 | Firman et al. | |
| 2013/0031204 A1 | 1/2013 | Graham et al. | |
| 2013/0046849 A1 | 2/2013 | Wolf et al. | |
| 2013/0346539 A1* | 12/2013 | Sivasubramanian ....................... H04L 67/2842 709/213 | |
| 2014/0006951 A1 | 1/2014 | Hunter | |
| 2014/0040301 A1* | 2/2014 | Chadha ............... G06F 16/2462 707/765 | |
| 2014/0047073 A1 | 2/2014 | Beme | |
| 2014/0181137 A1* | 6/2014 | Stein .................... G06F 16/3322 707/769 | |
| 2014/0223099 A1* | 8/2014 | Kidron ................ G06F 12/0806 711/118 | |
| 2014/0223303 A1 | 8/2014 | Cox et al. | |
| 2015/0026238 A1 | 1/2015 | Natarajan | |
| 2015/0051749 A1* | 2/2015 | Hancock ................. G06Q 50/06 700/295 | |
| 2015/0149544 A1* | 5/2015 | Zhang .................... G06Q 10/109 709/204 | |
| 2016/0070447 A1* | 3/2016 | Righter ............... H04N 21/4312 386/241 | |
| 2016/0085772 A1* | 3/2016 | Vermeulen .............. G06F 16/21 707/615 | |
| 2016/0086260 A1* | 3/2016 | Vermeulen .............. G06Q 40/00 705/35 | |
| 2016/0105710 A1 | 4/2016 | Watson et al. | |
| 2016/0140002 A1 | 5/2016 | Fee et al. | |
| 2016/0337426 A1 | 11/2016 | Shribman et al. | |
| 2017/0006036 A1* | 1/2017 | Bellingham ............ H04L 63/10 | |
| 2017/0032005 A1 | 2/2017 | Zheng et al. | |
| 2017/0041296 A1* | 2/2017 | Ford ..................... G06F 16/951 | |
| 2017/0103553 A1* | 4/2017 | Busayarat ........... H04L 67/2833 | |
| 2017/0104838 A1 | 4/2017 | Busayarat et al. | |
| 2017/0105049 A1 | 4/2017 | Busayarat et al. | |
| 2017/0177333 A1 | 6/2017 | Busayarat et al. | |
| 2017/0323028 A1* | 11/2017 | Jonker ................. G06F 16/9024 | |
| 2018/0060248 A1 | 3/2018 | Liu et al. | |
| 2018/0131633 A1* | 5/2018 | Li .......................... H04L 47/821 | |
| 2019/0095395 A1* | 3/2019 | Piecko .................... G06F 16/26 | |

FOREIGN PATENT DOCUMENTS

| | | |
|---|---|---|
| WO | 2007/054687 A1 | 5/2007 |
| WO | 2011/102824 A2 | 8/2011 |
| WO | 2017004138 A1 | 1/2017 |

OTHER PUBLICATIONS

Non-Final Office Action received for U.S. Appl. No. 15/285,439 dated Jul. 27, 2017, 27 pages.

Notice of Allowance received for U.S. Appl. No. 15/252,166 dated Mar. 22, 2018, 40 pages.

Final Office Action received for U.S. Appl. No. 15/285,439 dated Feb. 2, 2018, 23 pages.

El-Ansary, et al., "An Overview of Structured P2P Overlay Networks," In: Handbook on Theoretical and Algorithmic Aspects of Sensor, Ad Hoc Wireless, and Peer-to-Peer Networks 1 led] Jie Wu, Auerbach Publications, 2006, 27 pages.

Non-Final Office Action received for U.S. Appl. No. 15/291,247 dated Jun. 14, 2018, 70 pages.

Non-Final Office Action received for U.S. Appl. No. 15/290,722 dated Jun. 28, 2018, 29 pages.

Office Action received for Colombian Patent Application Serial No. NC2018/0005094 dated Aug. 22, 2018, 3 pages (including English translation).

Non-Final Office Action received for U.S. Appl. No. 15/285,439 dated Jul. 25, 2018, 32 pages.

European Office Action received for EP Patent Application Serial No. 16787677.0 dated May 30, 2018, 3 pages.

Office Action received for Chinese Patent Application Serial No. 201690001472.1 dated Aug. 17, 2018, 2 pages.

Non-Final Office Action received for U.S. Appl. No. 15/291,810 dated Nov. 19, 2018, 43 pages.

Final Office Action received for U.S. Appl. No. 15/285,439 dated Jan. 30, 2019, 41 pages.

(56) References Cited

OTHER PUBLICATIONS

International Search Report and Written Opinion for International Application Serial No. PCT/US2018/030717 dated Aug. 7, 2018, 16 pages.
Non-Final Office Action received for U.S. Appl. No. 15/290,722 dated Sep. 9, 2019, 23 pages.
Non-Final Office Action received for U.S. Appl. No. 15/285,439 dated Jul. 25, 2019, 39 pages.
Second Office Action received for Colombian Application Serial No. NC2018/0005094 dated Jul. 4, 2019, 30 pages (with English translation).
Non-Final Office Action received for U.S. Appl. No. 15/449,229 dated Jun. 28, 2019, 52 pages.
Notice of Allowance for U.S. Appl. No. 15/291,810 dated Apr. 22, 2019, 22 pages.
Notice of Allowance received for U.S. Appl. No. 16/054,278 dated Dec. 18, 2019, 58 pages.
Final Office Action received for U.S. Appl. No. 15/584,142 dated Nov. 6, 2019, 155 pages.
International Search Report and Written Opinion for International Application Serial No. PCT/US2019/055851 dated Nov. 22, 2019, 13 pages.
Summons to attend oral proceedings pursuant to Rule 115(1) EPC received for EP Application Serial No. 16787677.0 dated Dec. 6, 2019, 7 pages.
Final Office Action received for U.S. Appl. No. 15/290,722 dated Feb. 25, 2019, 33 pages.
Communication pursuant to Article 94(3) EPC received for EP Patent Application Serial No. 16787677.0 dated Mar. 13, 2019, 8 pages.
Non-Final Office Action received for U.S. Appl. No. 16/290,224 dated Apr. 22, 2020, 87 pages.

* cited by examiner

VIRTUAL GRAPH NODES

BACKGROUND

Client users interact with information via user interfaces, such as menus of data items (e.g., buttons, tiles, icons and/or text) by which a client user may make a desired selection. For example, a client user may view a scrollable menu containing data items representing video content, such as movies or television shows, and interact with the menu items to select a movie or television show for viewing.

A significant amount of information may be made available to client users. For example, with respect to a video such as a movie, in addition to the movie's title, a movie's associated data may include a rating, one or more images that represent the movie, a plot summary, cast and crew information, other credits and so on, which users often wish to have. However, it generally takes a while to assemble such information at the data service and download it to the client device. The client device then processes the information for rendering on a user interface.

When dealing with large numbers of data items, it can take a long time for a client to download and process the information. The amount of time can be undesirable, particularly when the information is downloaded via relatively low bandwidth connections, and/or processed by relatively low-powered client devices.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards returning a virtual node in response to a request for another node; (in one or more example implementations, the requested/returned nodes form a client graph that is used for a client user interface). A request for a node is received and determined to be a request for a virtual node. A main node is obtained and processed into the virtual node, including removing at least some data from the main node, and returning the virtual node in response to the request.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
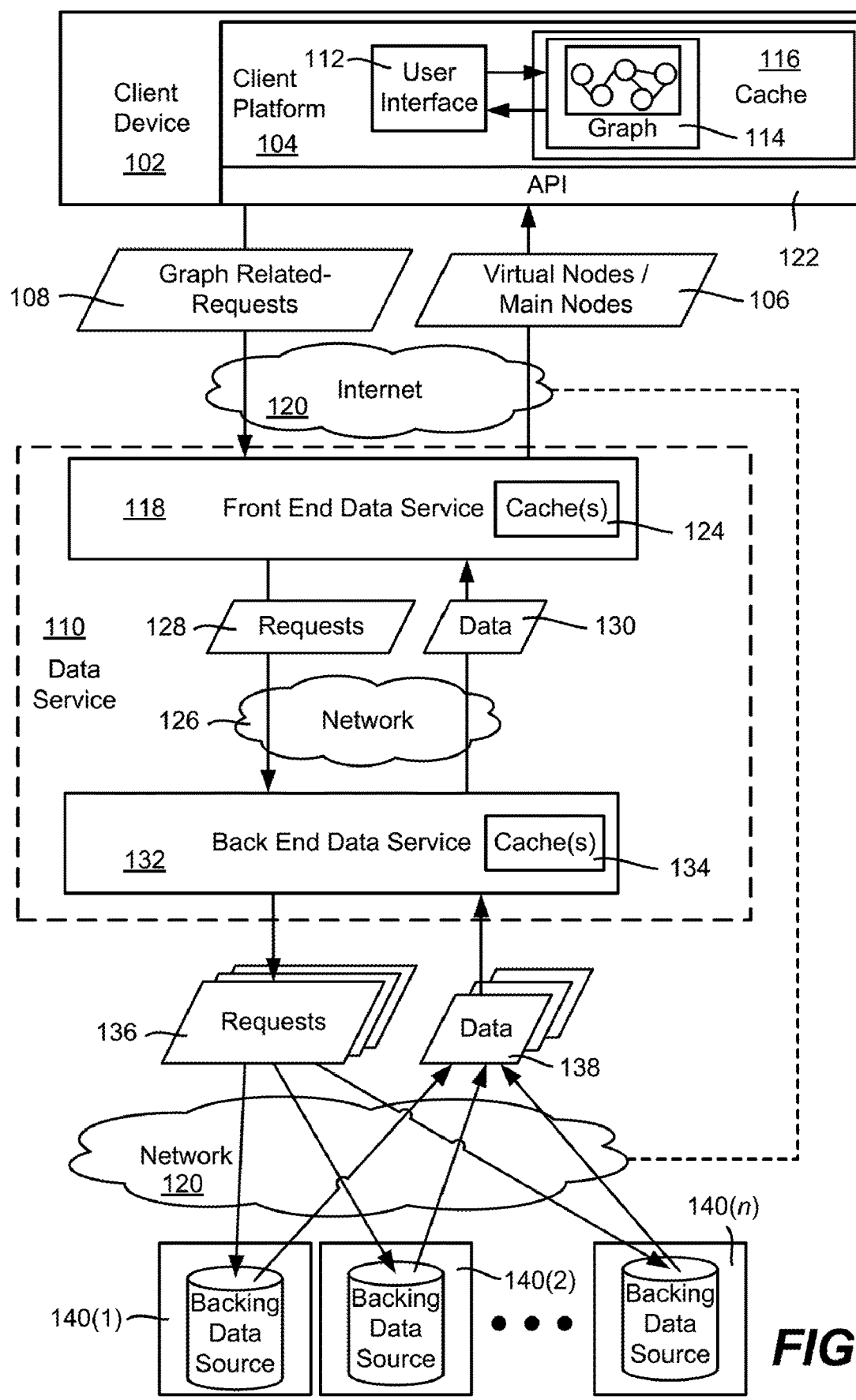
FIG. 1 is an example block diagram representation of a client device communicating with a data service to obtain data comprising virtual nodes and main nodes, according to one or more example implementations.

Various aspects of the technology described herein are generally directed towards returning less, mutated and/or more data, relative to a data item, in response to a request for that data item. The requested data item may, for example, be a "main" graph node, with the less, mutated and/or more data returned in a "virtual" node. In general and as will be understood, from a requesting client's perspective, virtual nodes are indistinguishable from "main" nodes; for example the client does not have to do any special processing to have a node that is a "virtual" node returned instead of a main node.

To this end, a virtual data item (e.g., a virtual graph node, or simply virtual node) is returned in response to client requests, in which the virtual node typically comprises a relatively lightweight set of information relative to the full set of information for the data item, e.g., maintained in a "main" (graph) node. For certain requests, such as those related to displaying user interface tiles in a menu, virtual nodes may be returned for the tiles instead of returning the main nodes; a main node may be returned when more specifically requested, for example.

In one or more implementations, various data for client interaction is maintained at the client as a graph of nodes and edges, in which each set of information (such as representing a movie) is maintained in a typed node. At least some of the graph nodes may be returned as virtual nodes, typically (but not necessarily) containing a smaller subset of the full set of data in its corresponding main node. As one result, a group of virtual nodes can be downloaded to a requesting client device more quickly than the same group of main nodes; moreover, the virtual nodes' information may be processed relatively quickly by the client device for use, e.g., for rendering a visible representation of those virtual nodes as part of a user interface.

By way of example, a movie may be represented by a unique identifier which acts as a key to a main node (e.g., comprising a feature-type node for a movie or television show) that contains that particular movie's related data. When a client device needs the movie information to render an interactive tile that represents that movie, not all of the main node's information may be needed for rendering the tile. As described herein, in one or more implementations the tile comprises a virtual node of the main node, in which the tile virtual node contains sufficient information for rendering a visible representation of the tile's data.

When a need for a tile's data results in a request for a corresponding graph node made to the data service, the request includes an indication that the tile is a virtual node that is coupled to a main node. For example, in one implementation, the indication is included in the request by encoding the main node's type as an indicator in association with the identifier that represents the virtual node/main node. When received by the data service, the data service recognizes from the encoded type information that a virtual node is desired by the client, and thus instead of returning the main node, the data service returns a virtual node, typically by removing information that is not part of the virtual node, e.g., generally the data not needed for rendering the tile. The remaining subset of information is returned to the client in the virtual node. If the client device needs the main node, such as because the client user interacts with the tile, the main node information is downloaded to the client.

As can be readily appreciated, downloading virtual nodes to the client for processing is often more resource efficient than downloading their corresponding main nodes; e.g., some virtual nodes' data may be a fraction of the size of their respective main nodes' data. For example with respect to interactive tiles, the client can thus receive and process a number of virtual nodes relatively quickly so that the menu is displayed with its rendered tiles relatively quickly. The user may select a tile for further interaction, in which event the main node for that tile is downloaded to the client. However, the main nodes for the other tiles are not necessarily needed. Indeed, no main node for a set of downloaded tiles may be needed, such as if the client scrolls the menu to see new tiles, (whereby some new tiles corresponding to virtual nodes may be requested), or if the client user navigates to a new menu without making a selection. As can be seen, instead of requesting full (relatively large) main nodes, the client transparently requests smaller virtual nodes, and only requests a single, full main node if and when needed.

Notwithstanding, it should be noted that the data of a virtual node is not necessarily a reduced subset of the data relative to the data of the main node. Rather, the data of a virtual node is a modified set of data relative to the main node data, wherein such modification may be by data removal, data addition and/or data mutation. In one or more implementations, rules for processing a main node into a virtual node may be provided to delete, mutate and/or add data (e.g., add data from another data source or sources such as another node).

It should be understood that any of the examples herein are non-limiting. For instance, some of the examples refer to data related to client selection of video content (including audio) from a streaming service that delivers movies, television shows, documentaries and the like. However, the technology described herein is independent of any particular type of data, and is also independent of any particular user interface that presents the data as visible representations of objects or the like. Further, while nodes are described, many other kinds of data structures may benefit from the technology described herein. Thus, any of the embodiments, aspects, concepts, structures, functionalities or examples described herein are non-limiting, and the technology may be used in various ways that provide benefits and advantages in data communication and data processing in general.

One or more implementations herein are exemplified in which the data underlying a client user interface comprise data items arranged as a graph of nodes and edges. In general, a graph is built by each client, in which each graph node (sometimes referred to herein as a "provider node" in the client device) represents a part of the underlying data that is available via a data service; (as used herein a "graph" is formed by the relationships between provider nodes or provider node data structures, regardless of whether visibly represented as nodes and edges).

To build the client graph, in addition to the data properties/attributes maintained in a provider node, a provider node's data also may include edge references to other provider nodes, as well as possibly more specific relationship information, e.g., indicative of a child or parent relationship to another provider node. The client platform software follows these references to obtain more provider nodes from the data service as needed. For example, if a provider node A, such as representing a menu, references two child provider nodes B and C, then when provider node A is to be rendered as a user interface menu object, the data is obtained for provider nodes B and C so that they can be rendered as UI objects that are part of the A menu, and so on. If a client interacts to select item B, e.g., a sub-menu object of menu A, then the provider node data for sub-menu B including B's referenced provider nodes are requested and obtained so that menu object B and its referenced provider node objects can be rendered. Note that one or more provider nodes may be returned from the data service in anticipation of their likely being needed rather than waiting for an actual need. Further, once obtained, provider nodes may be cached at the client so that they may be quickly accessed from the client cache rather than obtained via another (e.g., internet) request to the data service.

In general, data items as described herein, including provider nodes, have an identifier (ID) that is unique to the data service, and indeed may be globally unique. One or more implementations use a Uniform Resource Name (URN); (e.g., urn:hbo:menu:root) as the identifier. Provider nodes are typed; (note that in one scheme, the type of provider node also may be determined from its URN). Each provider node implements a model with a model interface that defines the schema/shape of the provider node's data. For example, with respect to video content, there may be a provider node of type "feature" that represents some streaming video content and includes a title, a URL to an image, a rating (if known), credits and so forth. As another example, a provider node of type "user" may represent a client user, and may have per-user data such as a username, parental controls (such as maximum rating allowed), a "watch-list" of user-specified (and/or for example machine-learned favorite) shows of particular interest or the like, and so forth. Via the user provider node, each different client user can have a per-user customized graph portion.

Thus, based upon user interaction as well as automated processes, using the graph of provider node relationships, a client software platform makes requests to a data service for one or more provider nodes to obtain their data as needed. The client requests may be to a request handling portion of a data service, e.g., a client interfacing front-end data service coupled to the client via the internet. The front-end data service interprets each request and responds with the requested data, which in one or more implementations may be obtained from a front-end cache, or via a back-end data service, including from a back-end cache and/or backing data sources. In this way the client software builds relevant portion(s) of the client graph as needed, which in general is highly efficient with respect to resource usage and obtaining rapid responses. Note that provider nodes may be cached at the client as described herein, and thus when data is needed the client platform may first attempt to use client-cached data without making a request to the request handling portion of the data service.

In one or more implementations, a child provider node referenced by a parent node may be referenced as a virtual node from type information encoded in the reference. For example, consider a parent menu node that contains child tile nodes. Those tile nodes already may be referenced as virtual nodes, e.g., in edge references (e.g., URNs) contained in the parent node. As will be understood, when such a child tile node is needed from the data service, the data service recognizes from type information encoded in the URN that a virtual node that corresponds to a main node is being requested. Thus, before being returned to the client, the corresponding main node is processed by the data service into the virtual node. Thus, in such an implementation, the concept of a virtual node is transparent to the client, which need not perform any action to obtain a virtual node other than request the child node as already referenced by the parent.

FIG. 1 is a block diagram representing example components that may be used to handle client requests for data items, which for example may comprise graph nodes of a client graph. As exemplified in FIG. 1, a client device 102 runs client platform software 104 that receives data items comprising nodes 106. As described herein, virtual nodes and main nodes may be returned among the nodes 106, based upon graph-related requests 108 made to a data service 110. In this way, the client platform software 104 may present visible representation of objects on a user interface 112, by rendering menus comprising buttons, icons, tiles and so forth by which a user can navigate to other locations and/or make a selection. Note the in one or more implementations, the user interface objects are configured to render visible representations of themselves as well as make requests for any needed data, including for data corresponding to their child objects, and so on.

In one or more implementations, the client software program's UI elements or the like may make requests for data to the client platform (e.g., at a data service level) without needing to know about how the underlying data is maintained, organized, retrieved and so forth. For example, a tile object that represents a television show may in a straightforward manner send a request to the client platform software 104 for a title and rating corresponding to a feature ID, and get the title and rating back. As will be understood, beneath the UI level, the client platform software 104 may obtain the title from a main node or virtual node corresponding to that ID. Such data may be obtained from a client cache that contains the data items comprising the graph nodes, but if not cached at the client, by requesting the node from a data service, as described herein.

As set forth above, in an example graph-based implementation, each provider node may reference one or more other provider nodes, which forms a graph 114 (e.g., generally maintained in a client cache 116 or other suitable data storage). The client graph 114 is built by obtaining the data for these other provider nodes as needed, such as when provider nodes (or sub-parts thereof) are rendered as visible representations of objects on the interactive user interface 112. Example visible representations of provider node data may include menus, tiles, icons, buttons, text and so forth.

In general, the client graph 114 comprises a client-relevant subset of the overall data available from the data service 110; (the available data at the data service can be considered an overall virtual graph). To obtain the data items (e.g., uniquely identified provider nodes) 106, the client platform 104 interfaces with the data service 110, e.g., via a client interfacing front-end data service 118, over a network such as the internet 120. An application programming interface (API) 122 may be present that may be customized for devices and/or platform software versions to allow various types of client devices and/or various software platform versions to communicate with the front-end data service 118 via a protocol that both entities understand.

The front-end data service 118 may comprise a number of load-balanced physical and/or virtual servers (not separately shown) that return the requested provider nodes 106, in a manner that is expected by the client platform software 104. Some of the requests for a provider node may correspond to multiple sub-requests that the client platform software 104 expects in a single provider node; for example, a request for a feature provider node that represents a feature (movie) may correspond to sub-requests for a title (in text), an image reference such as a URL, a rating, a plot summary and so on. A request for a user's "watch list" may correspond to requests for multiple tiles. The data service 110 understands based upon each provider node's type how to obtain and assemble data sub-parts as needed, from possibly various sources, into a single provider node to respond to a client request for a provider node.

The corresponding provider node may be contained in one or more front-end caches 124, which allows like requests from multiple clients to be efficiently satisfied. For example, each load-balanced server may have an in-memory cache that contains frequently or recently requested data, and/or there may be one or more front-end caches shared by the front-end servers. The data is typically cached as a full provider node (e.g., a tile corresponding to data from multiple sub-requests), but it is feasible to cache at least some data in sub-parts that are aggregated to provide a full provider node. It is also feasible to cache virtual nodes as described herein.

Some or all of the requested data may not be cached (or may be cached but expired) in the front-end cache(s) 124. For such needed data, in one or more implementations, the front-end data service 118 is coupled (e.g., via a network 126, which may comprise an intranet and/or the internet) to make requests 128 for data 130 to a back-end data service 132.

The back-end data service 132 similarly may comprise a number of load-balanced physical and/or virtual servers (not separately shown) that return the requested data, in a manner that is expected by the front-end data service 118. The requested data may be contained in one or more back-end data caches 134. For example, each load-balanced back-end server may have an in-memory cache that contains the requested data, and/or there may be one or more back-end caches shared by the back-end servers. Note however that in one or more implementations, the back-end service only caches main nodes, not virtual nodes, as in such implementation(s) the back-end service is not configured to deal with the concept of virtual nodes.

For requests that reach the back-end data service 132 but cannot be satisfied from any back-end cache 134, the back-end data service 132 is further coupled (e.g., via an intranet and/or the internet 120) to send requests 136 for data 138 to one or more various backing data sources 140(1)-140(n). Non-limiting examples of such data sources 140(1)-140(n) may include key-value stores, relational databases, file servers, and so on that may maintain the data in virtually any suitable format. A client request for provider node data may correspond to multiple sub-requests, and these may be to backing data sources; the data service 110 is configured to make requests for data in appropriate formats as needed to the different backing data sources 140(1)-140(n). Moreover, one data store's data may override another data store's data; e.g., the data for a television show may include a generic image URL obtained from one data store, however an "editorial"-like data store may override the generic image with a different image, such as for some uncharacteristic episode.

As is understood, in a user interface that includes displays of menus of tiles (and/or buttons), each menu object and tile (or button) object may correspond to a provider node's data, which may be made up of multiple component parts. For example, a menu provider node may contains tiles and/or buttons, including an example tile that may obtain its data from a feature type provider node, which includes sub-parts comprising text and a representative image URL or the like, as well as possibly other sub-parts (e.g., rating), credits and so forth. It should be noted that while one or more implementations of the back-end data service have no concept of a virtual node, it is alternatively feasible to have a back-end data service that processes main nodes into virtual nodes, or at least participates to some extent in the modification.

Figure 2:
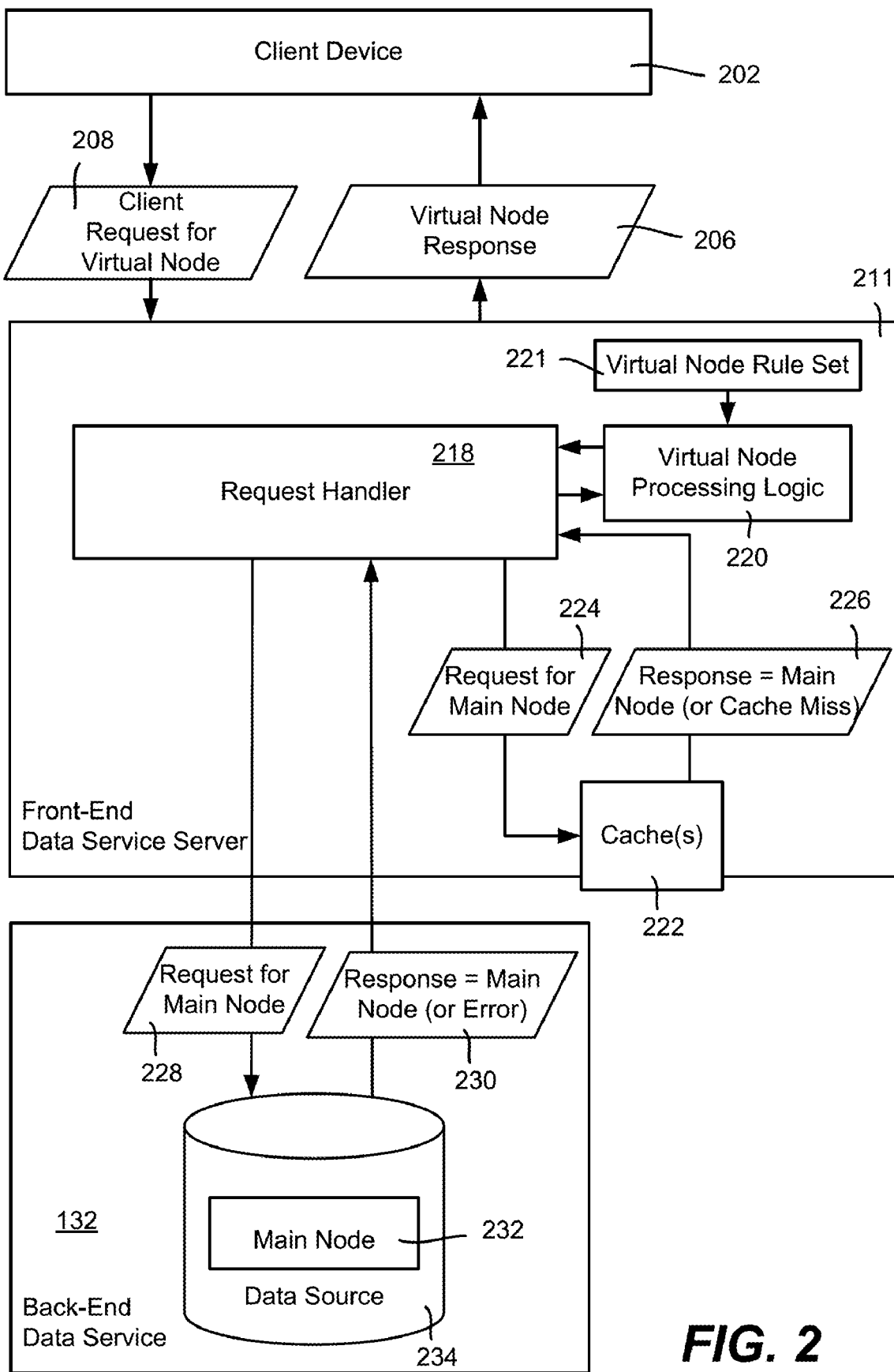
FIG. 2 is a representation of example data service components that obtain, process and return client-requested data, including virtual nodes, according to one or more example implementations.

FIG. 2 exemplifies the concept of virtual nodes, in which a client device 202 makes a request 208 for a virtual node to a request handler 218 of a server 211 of the front-end data service. As set forth herein, one kind of virtual node comprises a tile that has as its corresponding main node a feature-type node. When a tile requests a virtual node, the client device 202 (e.g., a request manager of the client platform software) sends the identifier, which may be generally the same for the virtual node and the main node, along with an indication that a virtual node is desired. For example, a tile virtual node may be identified as "urn:hbo:tile:GVhxAxgVh5ZRpwnAKAABm:type:tile" whereas the main node may be "urn:hbo:feature:GVhxAxgVh5ZRpwnAKAABm: type:feature" (although because the string "feature" is embedded in the URN, the encoded type information may be omitted in one or more implementations). Note that the client device 202 may make batch requests to the front end data service, and the tile virtual node request 208 may be a get request or may be part of a batch request.

The request handler 218 receives the request and recognizes the request via the encoded "type:tile" as requesting a virtual node, and attempts to obtain the virtual node from the cache. The request handler 218 looks in the front end data service cache set 222 (one or more front-end caches, which for example may be accessed via a request 224 to a cache framework library) for the virtual node, and if not found, for the main node. Note that in alternative implementations, it is feasible for the front-end data service/front-end servers to only may cache main nodes, rather than caching both virtual nodes and main nodes.

If the virtual node is cached and valid, it is returned in a cache response 226; else if not cached and the main node is cached and valid, the request handler 218 invokes virtual node processing logic 220; (main node requests need not be processed into virtual nodes). The virtual node processing logic 220 processes the main node into a virtual node, e.g., by accessing a rule set 221 that specifies removing or otherwise modifying certain data as described herein, such as by applying the rule set, and via the request handler 218 returns the virtual node in a response 206 to the client device. If a cache miss is returned in the response 226, the request handler 218 makes a request 228 for the main node to the back-end data service 132, which returns a response 230 comprising the main node 232 from a data source 234 (e.g., from one of the back-end caches 134 in FIG. 1 or the one or more backing data sources 140(1)-140(n); the back-end service also may return an error). Note that in one or more implementations the back-end service only deals with main nodes. Typically the main node is returned (and not an error) from the back end service, and the virtual node processing logic 220 is invoked to process the main node data in the response 230 into the virtual node for returning in the response 206 as described herein. The virtual node may be cached.

Once obtained and returned to the front end data service server, the main node also may be cached at the front-end data service cache set (e.g., written through to the relevant in-memory server cache and the shared cache). In this way, if the client device 202 requests the main node, or another client requests the main node or its corresponding virtual node, the data is already available (until expired) at the front-end service cache set 222 for rapid retrieval.

Figure 3:
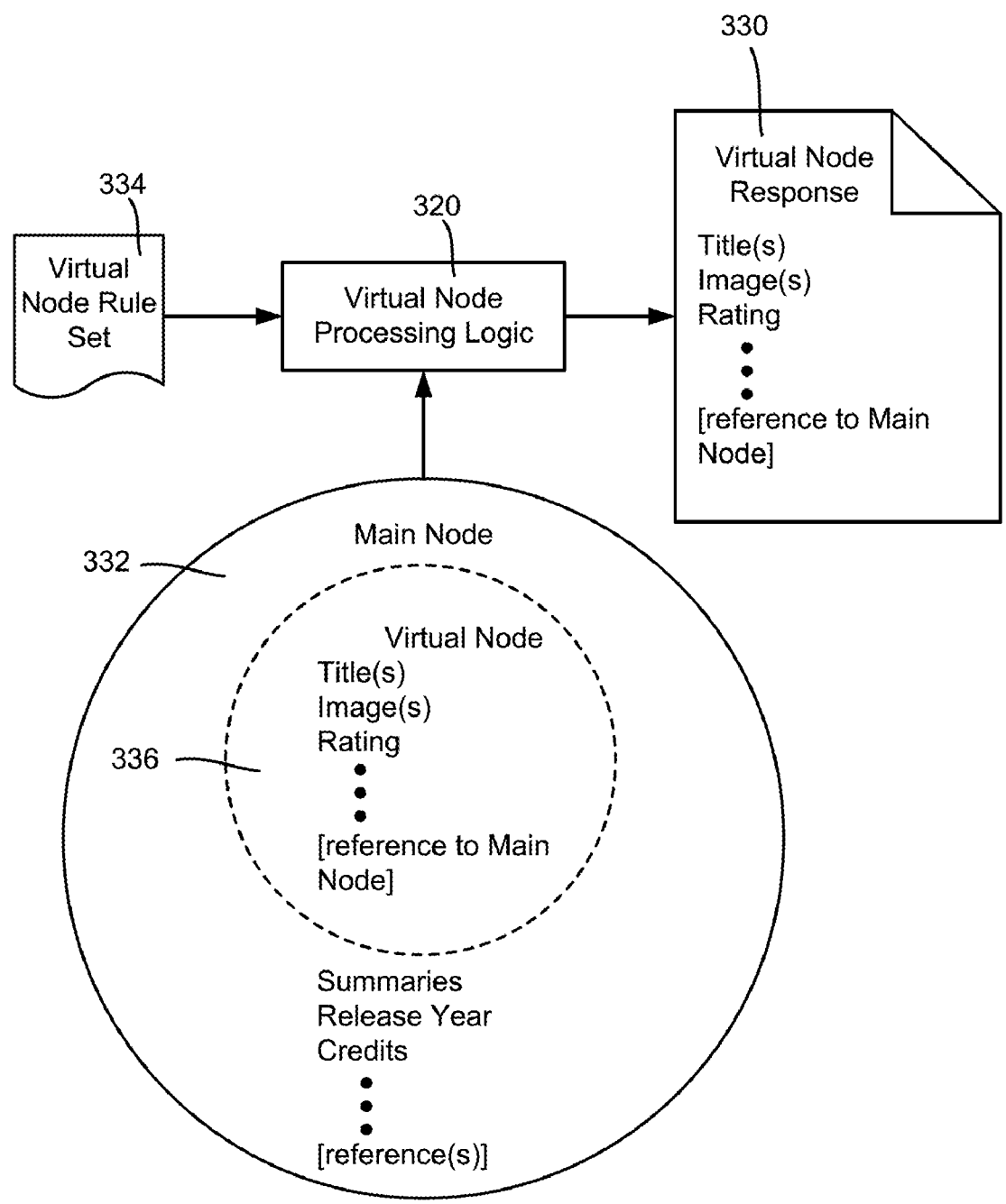
FIG. 3 is an example representation of processing main node data into a virtual node response, according to one or more example implementations.

FIG. 3 exemplifies how a virtual node response 330 may be extracted from data of a main node 332. In general, an instance of the virtual node processing logic 320 applies an appropriate instance of a rule set 334 to determine what data 336 of the main node 332 to include and/or exclude, as well as any data to mutate and/or add from another source. A rule set may be a single instruction for all virtual nodes of the same type, e.g., "remove the credits" from the main node, or may be as complex as desired, as well as being based upon the type of client device, type of network connection, bandwidth and so forth. One way to obtain a relevant rule set for a node and/or node type, possibly based upon client-specific information, is described below with reference to FIGS. 4 and 5. Note that FIG. 3 is only for purposes of illustration, and that the actual structuring/ordering of the virtual node data may be non-contiguous/interleaved in any manner within the other main node data. For example, the titles' data may be followed by summaries' data and then the images' data (URLs).

The following shows one possible example of a main node response, followed by its corresponding virtual node response, in which as can be seen, the virtual node response comprises a reduced subset of the main node response's data along with a reference to the main node:

Main Node Response:

```
{
    "id": "urn:hbo:feature:GVhxAxgVh5ZRpwnAKAABm",
    "statusCode": 200,
    "headers": {
        "ETag": "\"b42-OK+jqM3eile9GpXf1m+7fg\"",
        "Cache-Control": "max-age=12190"
    },
    "body": {
        "titles": {
            "short": "Baby's Day Out"
            "full": "Baby's Day Out"
        },
        "summaries": {
            "short": "Three klutzy kidnappers grab a wealthy couple's baby, only to have the toddler escape and lead them on a slapstick chase all over Chicago.",
            "full": "When three klutzy kidnappers grab a wealthy couple's baby, they think the $5 million ransom is a sure thing. Wrong! The nine-month-old escapes, and leads the trio on a slapstick chase around Chicago, getting into one dangerous situation after another that always end badly for the bad guys."
        },
        "images": {
            "largeTile":
            "https://artist.api.lv3.cdn.hbo.com/images/GVhxAxgVh5ZRpwnAKAABm/detail?v=NbNDapPBrYVTpYYNKPU6ug&size=1280x720&format=jpg",
            "mediumTile":
            "https://artist.api.lv3.cdn.hbo.com/images/GVhxAxgVh5ZRpwnAKAABm/detail?v=NbNDapPBrYVTpYYNKPU6ug&size=374x210&format=jpg",
            "smallTile":
            "https://artist.api.lv3.cdn.hbo.com/images/GVhxAxgVh5ZRpwnAKAABm/detail?v=NbNDapPBrYVTpYYNKPU6ug&size=280x158&format=jpg",
            "background":
            "https://artist.api.lv3.cdn.hbo.com/images/GVhxAxgVh5ZRpwnAKAABm/background?v=GSREhVKMCRYSEc5J9KThCA&size=1920x1080&format=jpg"
        },
        "isFree": false,
        "releaseYear": 1994,
        "ratingCode": "PG",
        "credits": {
            "cast": [{
                "role": "Eddie",
                "person": "Joe Mantegna"
            }, {
                "role": "Laraine Cotwell",
                "person": "Lara Flynn Boyle"
            }, {
                "role": "Norby",
                "person": "Joe Pantoliano"
            }],
            "directors": [{
                "role": "Directed By",
                "person": "Patrick Read Johnson"
            }],
            "producers": [{
                "role": "Producer",
                "person": "John Hughes"
            }, {
                "role": "Producer",
                "person": "Richard Vane"
            }, {
            "role": "Executive Producer",
            "person": "William Ryan"
            }],
            "writers": [{
            "role": "Written by",
            "person": "John Hughes"
            }]
        },
        "musicBy": [
            "Bruce Broughton"],
        "soundtrack": [{
            "title": "This Is the Army, Mr. Jones",
            "composers": [
            "Irving Berlin"]
        }],
        "analyticsId": "GVhxAxgVh5ZRpwnAKAABm",
        "playbackMarkerId": "GVhxAxgVh5ZRpwnAKAABm",
        "references": {
            "edits": [
                "urn:hbo:edit:GVjqhTA6WKGwxwpoKAABY:feature:GVhxAxgVh5ZRpwnAKA
```

```
                ABm"],
            "previews": [
                "urn:hbo:edit:GVhxAxgZLMMITwy0KAAB:preview:GVhxAxgXD6ouuJyYKAA
                CM:feature:GVhxAxgVh5ZRpwnAKAABm"]
        }
    }
}
```

Virtual Node Response (the "References" Data at the End References the Main Node ID):

```
{
    "id": "urn:hbo:tile:GVhxAxgVh5ZRpwnAKAABm:type:feature",
    "statusCode": 200,
    "headers": {
        "ETag": "\"396-nnRrH5jIhi7qyHK5S1lvQw\"",
        "Cache-Control": "max-age"21532"
    },
    "body": {
        "titles": {
            "short": "Baby's Day Out",
            "full": "Baby's Day Out"
        },
        "images": {
            "largeTile":
            "https://artist.api.lv3.cdn.hbo.com/images/GVhxAxgVh5ZRpwnAKAABm/detail?
            v=NbNDapPBrYVTpYYNKPU6ug&size=1280x720&format=jpg",
            "mediumTile":
            "https://artist.api.lv3.cdn.hbo.com/images/GVhxAxgVh5ZRpwnAKAABm/detail?
            v=NbNDapPBrYVTpYYNKPU6ug&size=374x210&format=jpg",
            "smallTile":
            "https://artist.api.lv3.cdn.hbo.com/images/GVhxAxgVh5ZRpwnAKAABm/detail?
            v=NbNDapPBrYVTpYYNKPU6ug&size=280x158&format=jpg",
            "background":
            "https://artist.api.lv3.cdn.hbo.com/images/GVhxAxgVh5ZRpwnAKAABm/backgr
            ound?v=GSREhVKMCRYSEc5J9KThCA&size=1920x1080&format=jpg"
        },
        "ratingCode": "PG",
        "isFree": false,
        "playbackMarkerId": "GVhxAxgVh5ZRpwnAKAABm",
        "sortString": "baby s day out",
        "references": {
            "viewable": "urn:hbo:feature:GVhxAxgVh5ZRpwnAKAABm"
        }
    }
}
```

Although it is possible to have a single way to process main nodes into virtual nodes for any situation, in one or more implementations, different virtual node rules for reducing the main node data may be used for different virtual nodes/node types, client device classes or device types and/or software versions. For example, a tile for a low-powered device type may have a virtual node rule specifying that only a single ("smallTile") image reference (e.g., URL) be returned in the virtual node, whereas the same virtual node for another device may contain "smallTile" "mediumTile" "LargeTile" and "Background" image references. Rules or the like based upon the device types and/or software version may be applied to customize device type and/or software version virtual node processing. An example rule may specify what to include and/or exclude, mutate and/or add, e.g., "include titles, images, ratingCode, isFree, playbackMarkerId and sortString plus reference" or "include titles, images, ratingCode, isFree, playbackMarkerId and sortString plus main node reference" or "include titles, images (exclude largeTile), ratingCode, isFree, playbackMarkerId and sortString plus main node reference" and so forth. Information may be added "rule 1: add text to indicate that this movie just received an award" and/or other information may be mutated "rule 2: replace image URL X with image URL Y."

Figure 4:
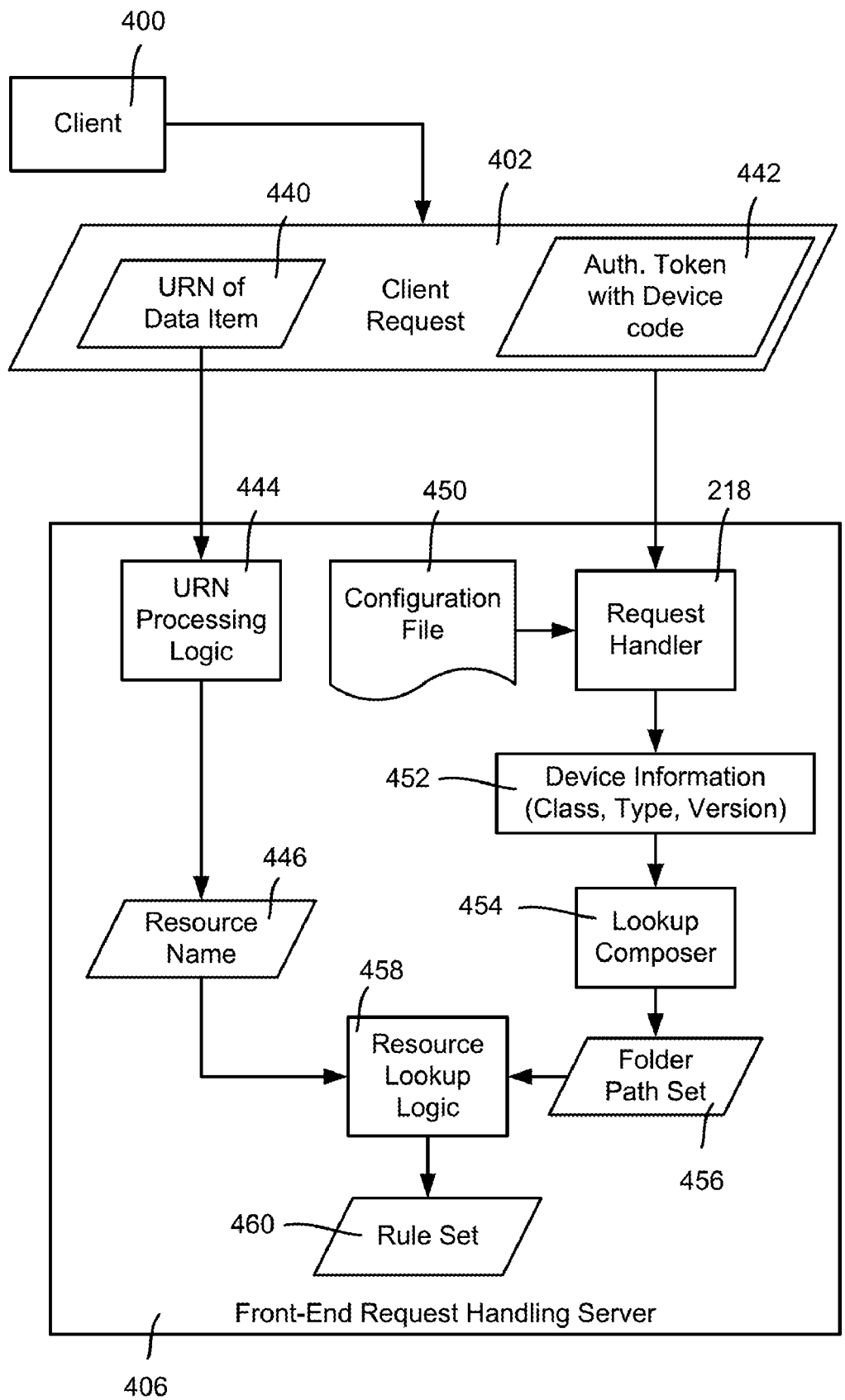
FIGS. 4 and 5 are example block diagrams representing how a data item identifier and client-specific information such as device code may be used to select a virtual node processing rule for the requested data item (or data item type), according to one or more example implementations.
Figure 5:
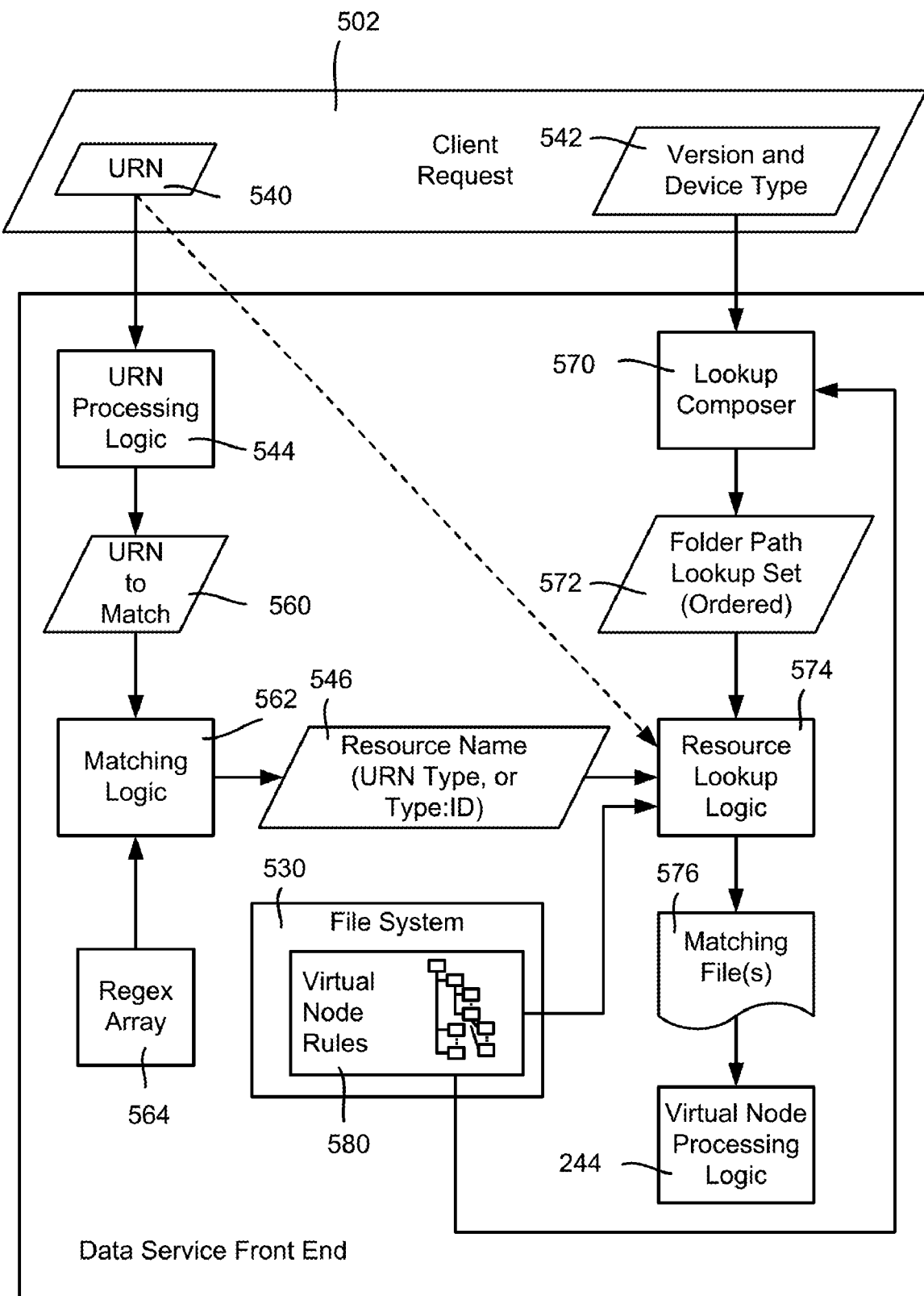

FIGS. 4 and 5 exemplify how a request 402 from a client 400 may be processed to determine which rule set for a virtual node to select. As described herein, client requests include an object identifier (object ID) such as in the form of a uniform resource name (URN) 440. A client request also includes a token 442, which among other purposes (e.g., authentication) may include client device-specific information (e.g., a device code) that indicates the type (e.g., the vendor and model as needed to differentiate from others) of the requesting client device, and/or its software version. The software version information may be part of the device code, or may be in another code (e.g., appended to a device-only code); for purposes of explanation, consider that as used herein, "device code" identifies the device and the software version information.

In general, URN processing logic 444 determines a resource name 446 from the URN, which may be a type or a type:ID combination. For example, certain types of requests may be grouped together as a type of resource; e.g., for requests for a "tile" type, a subset of the rule hierarchy may have tile rules, and so on.

Along with processing the URN, the virtual node processing logic 448 uses information in a configuration file 450 to obtain client device-specific information 452 based upon the device code, e.g., device class, device type, and software version information. For example, each device code, via the configuration file 450 or the like on the front-end data service server 406, may be mapped to a device "class" comprising a category of devices that generally share the same design and thus tend to have the same data requirements, possibly with some device-specific exceptions. For example, a particular smartphone from the same vendor may have at least some of its models configured to run the same client platform software and thus expect the same form of each data item's data. Thus, a device's code and class may be determined by the combination of the device code (from the request) and the data service's configuration file 450, and thus the request need only provide the device code via its token 442.

Using this client device-specific information 452, a lookup composer 454 builds a set of paths to the resources in the hierarchy, including virtual node rules. If, for example, the resource hierarchy corresponds to a file system hierarchy, then the paths to the resources are in a set of folder paths 456. A more specific example of token processing logic 448 and corresponding rule selection is described herein with reference to FIG. 5.

In one or more example implementations, the folder set's paths are ordered from most specific to least specific. Resource lookup logic 458 uses the resource name 446 and the folder path set 456 to find the most specific rule set 460 that applies to the request.

FIG. 5 shows an example of finding an applicable rule set for a client device (and software version) via a hierarchical file system 530, in which data items are identified and requested via a URN that is unique (at least within the data service). When a client request 502 is received, along with the provider URN ID(s) requested, the client information (e.g., device type and software version, block 542) are also known to the data service front-end server as described herein.

In one or more example implementations, URN processing logic 544 provides each client identified provider URN into each URN to match 560, and matching logic 562 accesses a set of regular expressions (e.g., arranged in a Regex array 564) to determine a resource name 546 (e.g., a string) corresponding to the type or type:ID that matches the regular expression derived from that URN 560. The resource 546, e.g., represented by the text of the string, which in this situation comprises a virtual node rule set, is thus determined based upon the provider type or the provider type:ID.

In one or more implementations, the regular expressions are part of a configuration file comprising an array whose elements are a regular expression/rule (e.g., resource) name pair.

A configuration file is read in on service startup, and the regular expressions (with their rule name pairs) are compiled from the configuration file into the Regex array 564. In one or more implementations, this array 564 of regular expressions is then applied, in order, one-by-one via the matching logic 562, to the URN to match 560, and the first regular expression that matches is considered the matching resource; (note that because more than one can match, order matters and thus the array is ordered more specific to less specific, in general). The name of this resource, that is, the virtual node rule set file (or files) is returned from the matching engine and is used in resource lookup.

It should be noted that in a more simplified system, e.g., in which there only relatively a few data items rather than thousands of nodes of different types, the data item IDs may be more directly used, (e.g., as represented in FIG. 5 by the dashed arrow). For example, if only dozens of data items had to be dealt with for resource selection, then each data item ID (or unique portion thereof) may be used as is the "resource name" for resource lookup, e.g., without regular expression matching and so on, as described herein.

For matching the rule name 546 (e.g., derived from the URN) to a client-specific information (block 542, e.g., client device and/or software version), which in this example implementation has one or more associated rule set files, the file system hierarchy is leveraged. More particularly, based upon the version and device type data 542, a lookup composer 570 builds (or retrieves from a cache if previously built) a set of file system folder paths 572 for this version and device type, in which the paths are ordered so that more specific overrides less specific rule set files.

Thus a rule set is obtained by the virtual node processing logic for any particular type of request, device type and/or software version, e.g., to process a main node into a virtual node. For a tile node, for example, the rule set may process the main node data into tile virtual node data comprising reduced data relative to the main node and a main node reference, to return a relatively lightweight response.

Figure 6:
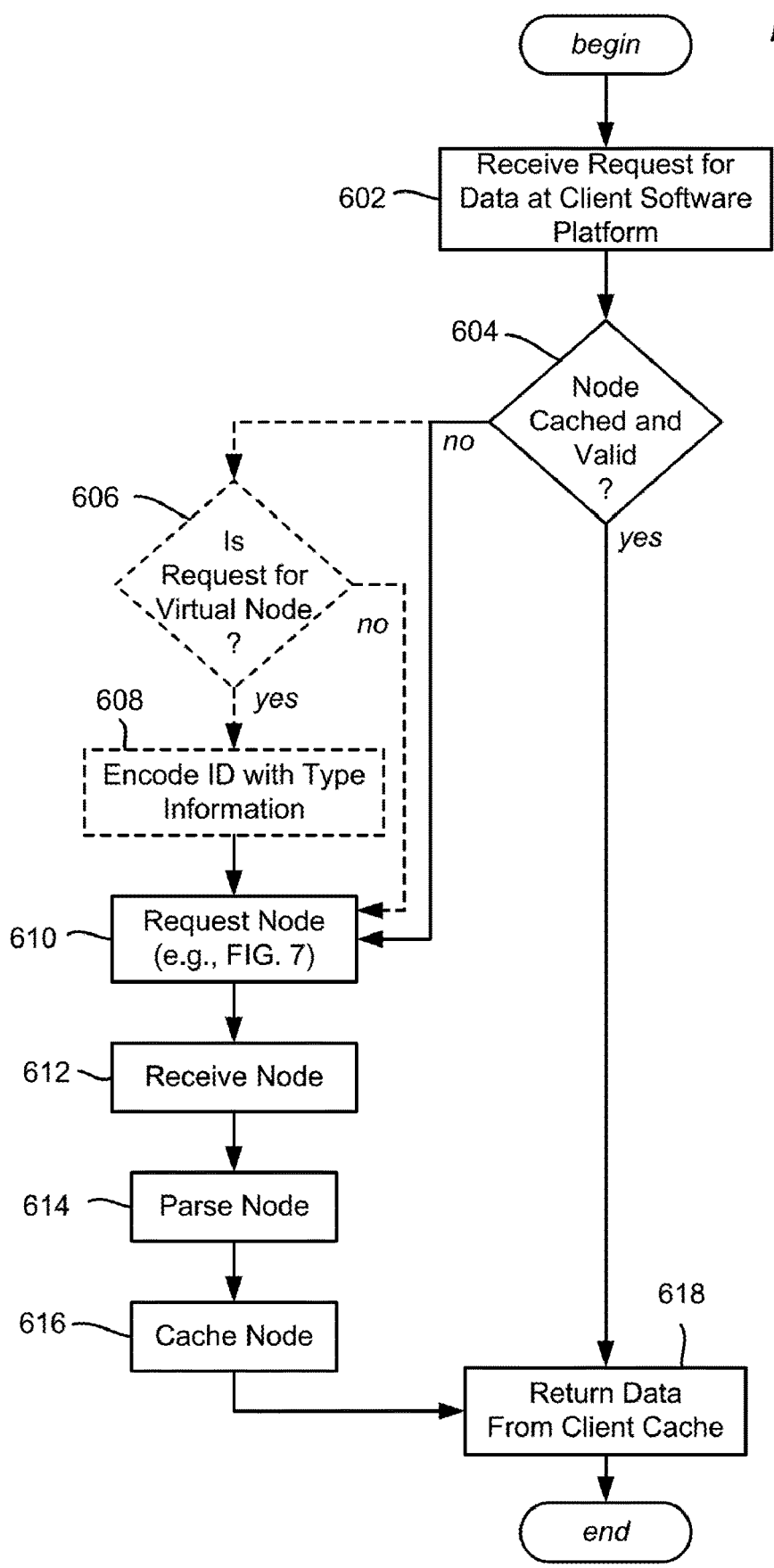
FIG. 6 is a flow diagram showing example logic/steps that may be taken by client device software to obtain and return data from a node, which may be a virtual node, to a client requestor (e.g., a user interface object), according to one or more example implementations.

FIG. 6 is a flow diagram showing operations that may be performed at a client device to obtain a virtual node or a main node in response to a request for data. As set forth above, a user interface component may have no idea of how the data beneath the user interface is maintained and accessed. Instead, the component requests data as needed; for example, a tile representing a movie may request a title, rating, and an image by providing a graph node ID.

The client software platform handles such requests (step 602) by accessing the client cache for a node containing these requested data items and returning the data from the cache if cached and valid (steps 604 and 618; the node data may be parsed into object format if needed before the data is returned). If a cache miss, the client software platform needs to obtain the node via a request to the data service.

As set forth above, in one or more implementations, the concept of a virtual node may be entirely transparent to a client as its type information is already encoded in the edge reference. In such implementations, if not cached at the client, step 604 branches to step 610 to request the referenced node, as described below.

However, in alternative implementations it is feasible for a client to recognize that certain requested nodes may instead be satisfied by virtual nodes. As shown in FIG. 6 via the dashed lines, step 606 represents the client software platform determining whether the request is for data that may be satisfied by a virtual node, if one corresponds to a main node. As set forth above, a request from a tile is considered to be a request for a virtual node, whereas a request for a feature node is for the main node. If a virtual node is being requested, step 608 encodes the identifier with an indication that the request is for a virtual node, e.g., by appending the "type:feature" indicator to the URN for the tile.

Step 610 sends the request from the client to the front-end data service. Step 612 receives the node, which is parsed and cached at steps 614 and 616. Note that the node may have data formatted in a non-object format (e.g., as a JSON data blob or XML data) when returned by the front-end data service; if so, step 614 parses the node into an object format. Step 618 then returns the data from the client cache. It should be noted that an error may be returned instead of the node, however error handling is generally not described in detail herein, as error handling may be performed in many ways, including well-known ways.

It should be noted that step 616 allows the client to cache a virtual node. This allows another virtual node request from the client UI or the like to be satisfied from the cache without needing the main node to be obtained before caching; (for example, if a tile is rendered, then scrolled off of a menu, then scrolled back into view, the virtual node data for that tile may be accessed via a cache). In an implementation in which only main nodes are cached at a client, step 616 may be bypassed for virtual nodes.

Figure 7:
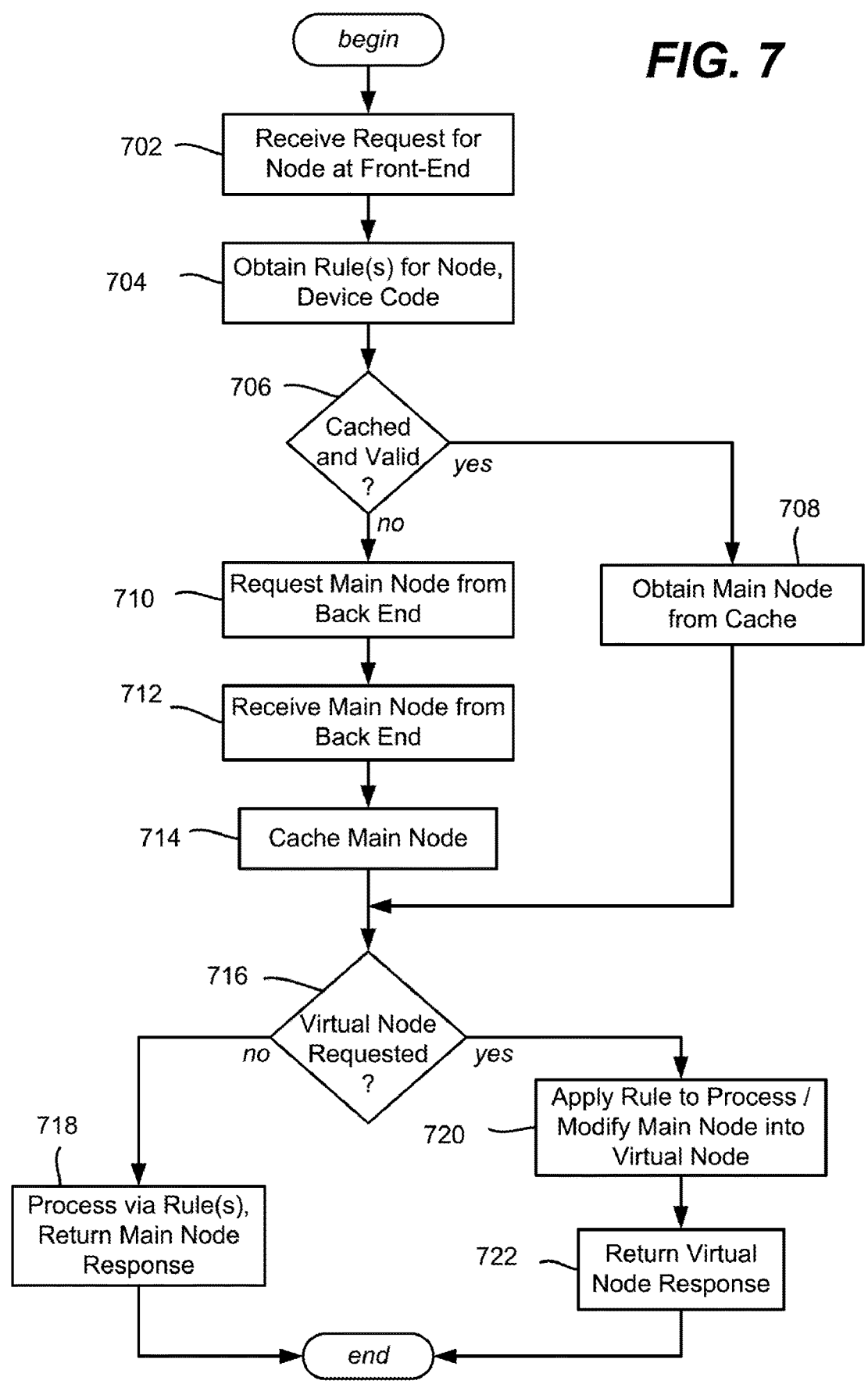
FIG. 7 is a flow diagram showing example logic/steps that may be taken by a front-end data service to obtain and return nodes to client devices, including virtual nodes, in response to client requests, according to one or more example implementations.

FIG. 7 shows request handing at the front-end data service, beginning at step 702 where the request is received. Step 704 represents obtaining the rule or rules for the requested node (e.g., node type) and client device code (e.g., device class and/or software version); the rule set may be used to determine how to strip data from the main node to return the virtual node. Note that step 704 may start the rule obtaining process, with other steps of FIG. 7 performed in parallel or as asynchronous subtasks in conjunction with obtaining the rules; the response may have to wait until the rule or rules are obtained and applied. Further note that other rules may be obtained with respect to returning a requested node; e.g., a rule may be a template file for the node type and device code may be retrieved that formats and shapes the data as needed by a client device, a rule may specify that an expanded request be made (that automatically expands a request for a node into a request for one or more other nodes, e.g., in anticipation of their likely being needed by the client).

Step 706 determines whether the main node is cached and valid; if so step 708 obtains the main node from the front-end cache set. Otherwise, step 710 requests the main node from the back end data service, with step 712 receiving the node in response, and step 714 caching the main node (e.g., via the cache framework, which caches the node in each cache such as the in-memory cache and the shared cache). Again, it should be noted that an error may be returned instead of the main node, however error handling is generally not described in detail herein, as error handling may be performed in many ways, including well-known ways.

Step 716 evaluates whether a virtual node was requested. If not, step 718 returns the main node in a response to a client; (note that one or more other rules are typically applied to a main node to process it before returning, such as to format and shape the main node data in a way a particular client expects). If so, step 720 applies the rule set to the virtual node to process (modify) the main node data into the virtual node, which may include removing data from the main node, adding data to the virtual node from another source, and/or mutating data in the main node into modified data in the virtual node. Step 722 returns the virtual node response. It should be noted that as set forth above, a template file or the like may be applied to the node to format and shape the data as expected by the client device class, type and/or software version; such a template file may be applied before returning the main node at step 718 or returning the virtual node at step 722. It is also feasible to have a template file shape the data for a virtual node, for example by stripping out non-virtual node data. In such an implementation, the template file thus may include the virtual node rule set. Indeed, in general the rule set that is selected for type "tile" is associated with a template that strips out a lot of the data and produces a "virtual" node, for example, whereas that the rule that is selected for type "feature" does not modify the main feature node in the same way.

Note that in general, the data service only deals with (e.g., obtains and caches) main node data, except near the end of the return pipeline where the virtual node processing logic of the front-end service strips out the non-virtual node data before returning a virtual node to a requesting client. However, it is feasible for the front-end data service to cache virtual nodes, as well as for the back-end data service to be aware of virtual nodes, so that, for example, a virtual node that does not need some part or parts the main node may be returned before the entire main node is ready (as described below with reference to FIGS. 8 and 9).

More particularly, as described herein, a node is made up of sub-parts, which may reside on different data sources. One or more of the data sources may be known to (and possibly arranged to) return certain information more quickly than others. For example, the virtual node data may be in a (key, value) store while at least some of the other main node data is maintained in databases that take longer to access.

Thus, an optimization is to have the back-end data service aware of the concept of virtual nodes so that the needed virtual node data may be returned to the front-end service before all of the main node data is obtained. An alternative is to have the front-end data service assemble the sub-parts into the main node, and return the virtual node once its sub-parts are ready even before the composing of the main node is complete. In any event, at one level of the data service, sub-parts may be requested and assembled into a main node, with virtual node logic recognizing that a virtual node may be processed from the retrieved main node parts returned before the entire main node is ready.

Figure 8:
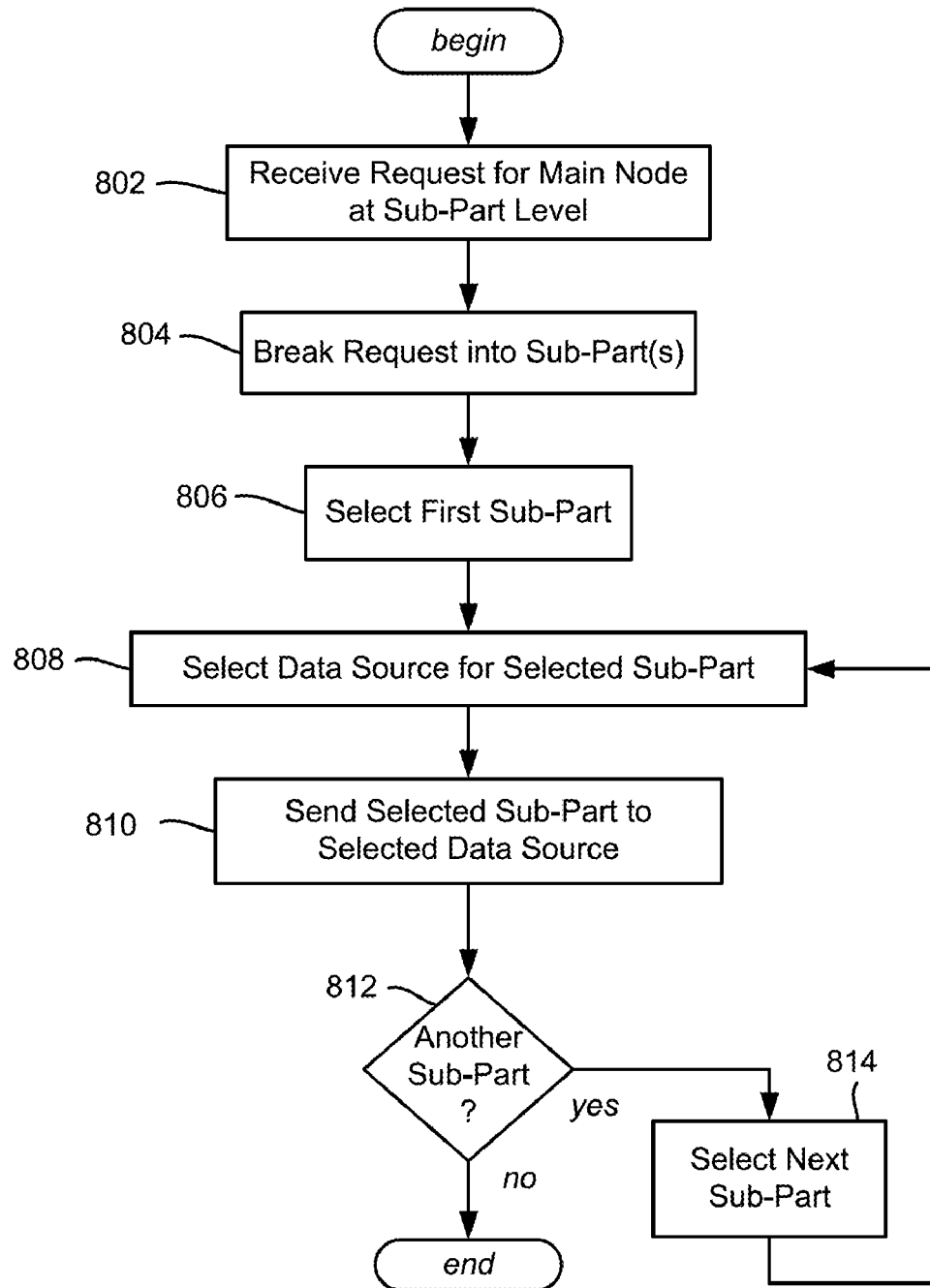
FIG. 8 is a flow diagram showing example logic/steps that may be taken to handle a request for a node by requesting sub-parts of the node, according to one or more example implementations.

Step 802 of FIG. 8 represents receiving a request for a main node at a level of the data service that knows about the sub-parts needed for the main node, so that step 804 can separate the sub-parts into separate requests as appropriate. Step 806 selects the first sub-part, with step 808 selecting the appropriate data source for the selected sub-part, and step 810 requesting the sub-part (which may be part of a batch request to that source). Steps 812 and 814 repeat the process for each other sub-part.

Figure 9:
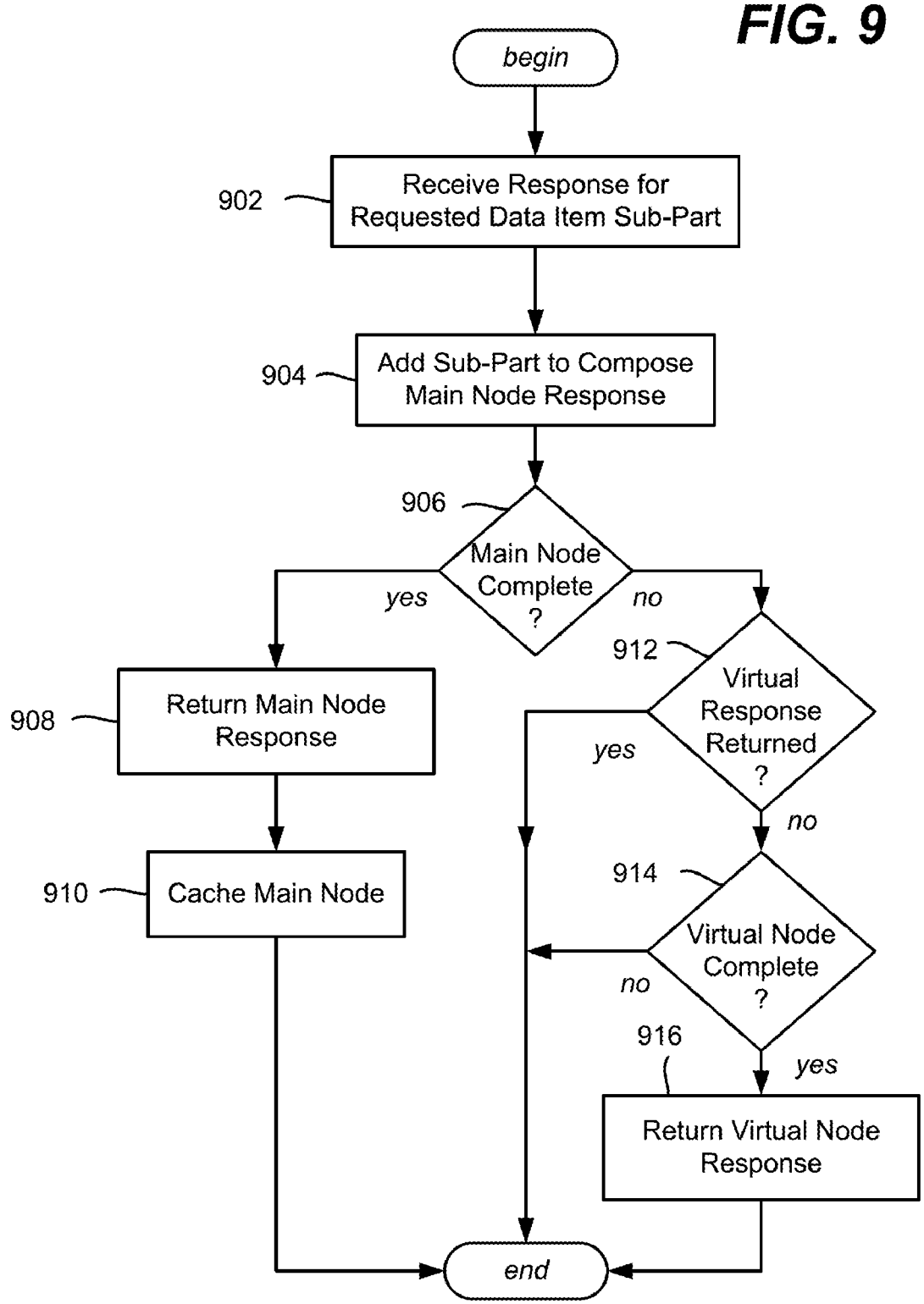
FIG. 9 is a flow diagram showing example logic/steps that may be taken to return a main node based upon assembling node sub-parts, including returning a virtual node when ready, according to one or more example implementations.

FIG. 9 represents receiving the sub-parts for assembling into the main node. Step 902 represents receiving a requested sub-part, with step 904 adding the sub-part to the main node data.

Sep 906 evaluates whether the main node is complete, that is, all sub-parts have been returned. If so, step 908 returns the main node, and step 910 caches the main node.

If the main node is not complete, then it is possible that the virtual node portion is complete based upon receipt of this sub-part. However, only one virtual node is returned, and thus step 908 evaluates whether a virtual node response has already been returned for this main node. If so, the process ends until the next-sub-part is received.

Otherwise step 914 evaluates whether this sub-part has completed the virtual node data. If so, the virtual node is complete and returned at step 916. In any event, the process ends until the next-sub-part is received. Note that although not shown, it is feasible to cache the virtual node once complete, e.g., following step 916.

It should be noted that if the main node is ready before the virtual node is sent, that is, the last sub-part was needed to complete the virtual node as well as the main node, then the above-described virtual node processing logic return a main node (similar to if the main node was cached or otherwise returned), with virtual node processing taking place thereafter (this return entire main node, then process into the virtual node, is the normal operation in one or more implementations). Further, a sub-part may be received in a batch with other sub-parts, and thus it may be desirable to process each sub-part before deciding on whether to return a virtual node response or a main node response to the requestor, if either or both are ready.

It should also be noted that in one or more implementations, any sub-part error makes the entire response an error, and thus complete. Thus, if a data source returns an error with respect to a requested sub-part, a main node response of "error" is returned, typically with an indication as to the type of error (e.g., requested data not found, request timed out, data source communication failed, and so on).

Figure 10:
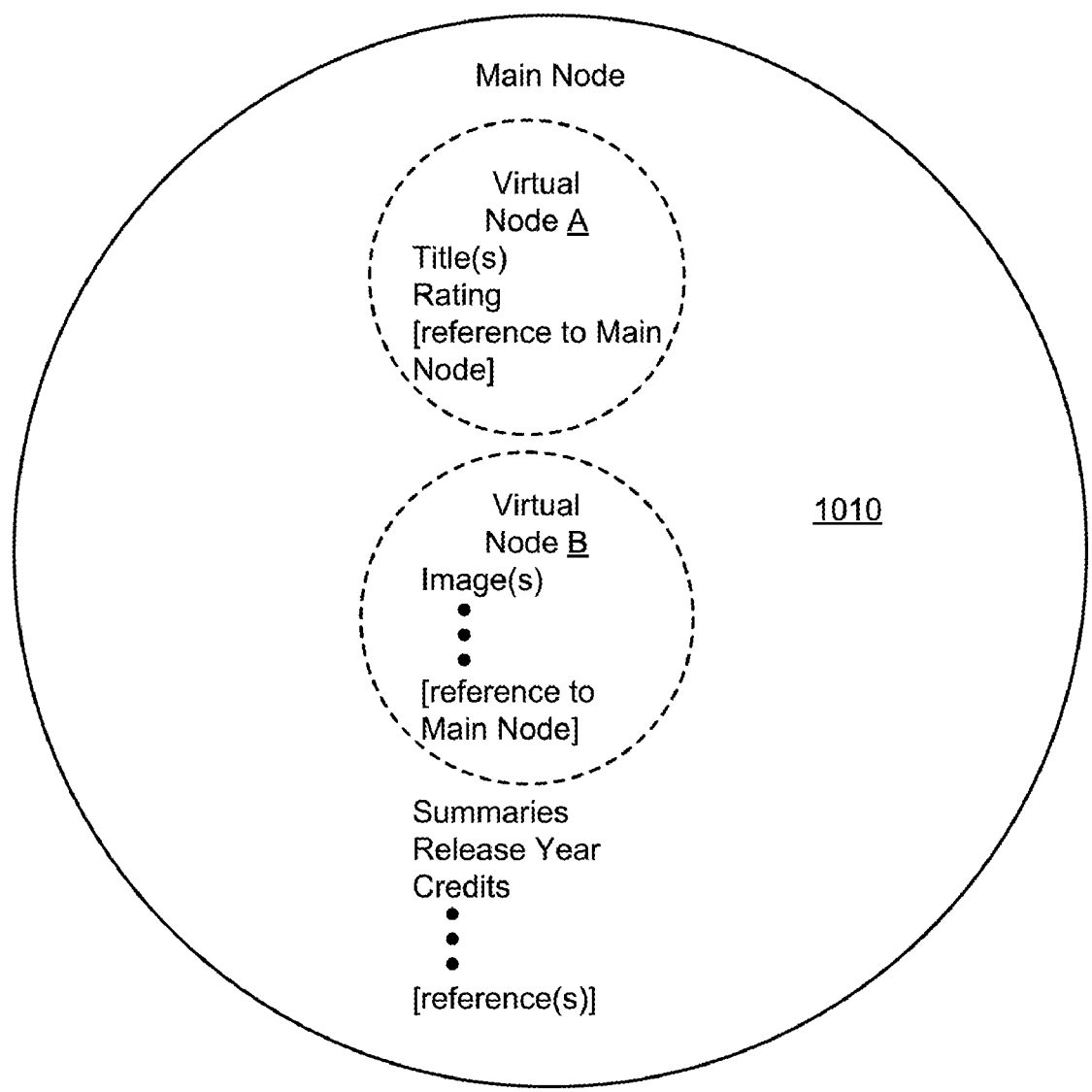
FIG. 10 is an example representation of a main node having a plurality of virtual nodes, according to one or more example implementations.

Turning to another aspect, a main node may have more than one virtual node. FIG. 10 shows the concept of a main node 1010 having two virtual nodes A and B. Virtual node A contains very little information relative to the main node, such as the title(s) and rating data, along with a reference to the main node. Virtual node B contains other data, such as the image URNs and other properties, along with a reference to the main node (and/or possibly virtual node A).

By way of example, consider that a client user interface can render tiles with only a title, and progressively render other data such as the images once obtained. A very fast (key, value) data store can be accessed to obtain the title and rating very quickly; indeed, the title and rating are very small in terms of storage, and such a data store may be store in fast memory at the back-end data service. When a request for the main node (its sub-parts) is received, using the logic of FIGS. 8 and 9, it is seen that the sub parts' data for virtual node A may be returned almost right away, while other data stores are accessed for virtual node B's data and the rest of the main node data.

The client may thus quickly receive the title and rating, and render a tile with just the title (and e.g., using the rating to decide whether to make the tile accessible based upon any parental controls for the user). The user may rapidly scroll through a menu of tiles (initially rendered with just their titles), and indeed may scroll past a tile before the image data is obtained for that tile. If the user stops scrolling, the image data is returned in virtual node B.

Turning to another aspect, it can be readily appreciated that a main node can be downloaded to the client in advance of its actual need, including without any client user interaction. To this end, if virtual node rules are being applied, a main node may be returned even if a virtual node is requested, e.g., by not stripping out the data for that particular node. For example, a request for the most recent episode of a very popular television show can be recognized as such by the data service (via a rule set for that episode) and returned as a main node instead of the virtual node. Although some extra data is returned, this allows pre-populating of the client cache in anticipation of a subsequent request for the main node; it may be far more efficient to return such extra data for certain virtual node requests than to receive a separate request for the main node. The substitution of the main node may be based upon statistics or other predictions that increase overall efficiency; e.g., a high percentage of users interact with the a certain episode's tile (virtual node) and need the main node, so provide the main node even if not specifically requested and conserve overall resources.

An alternative to substituting the main node for a virtual node is to return the virtual node as requested, with the main node automatically returned as an expanded node. As set forth above, it is feasible to use a rule to modify a query for a node into an expanded request, which may include the main node (as well as possible other nodes). This similarly pre-populates the client cache, and while returning even more information, (the virtual node and the main node), this alternative allows for returning the virtual node before the main node is ready (e.g., if the sub-part logic of FIG. 9 is used). As an optimization, a node that was not explicitly requested but obtained via an expanded query may be cached in an unparsed (e.g., JSON data blob) form rather than parsed into object form, so that the parsing operation only occurs if actually needed.

Figure 11:
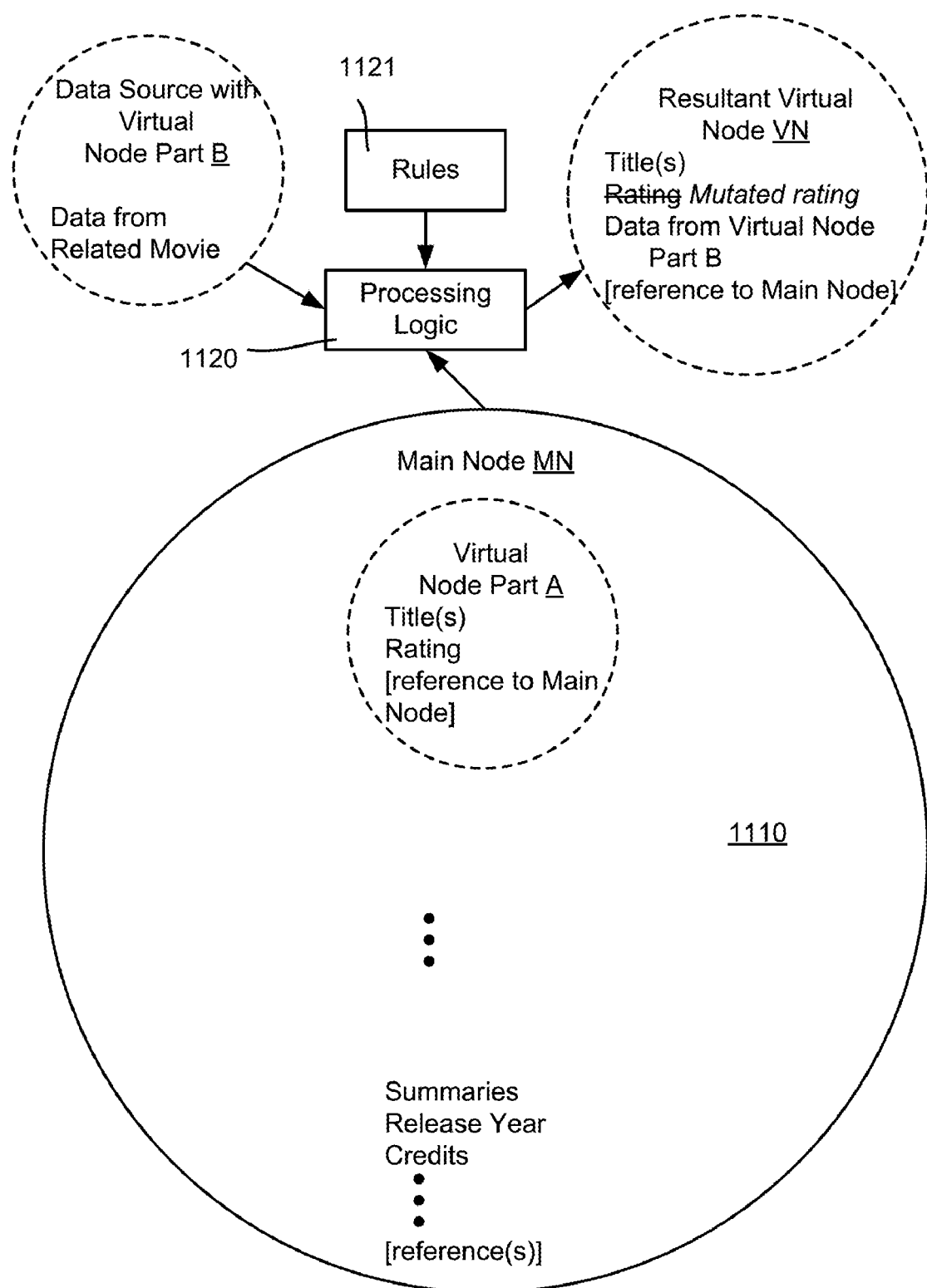
FIG. 11 is an example representation of generating a virtual node from a main node and another data source based upon rules, according to one or more example implementations

Yet another aspect is exemplified in FIG. 11, in which a virtual node VN is processed by processing logic according to a rule set 1121, e.g., selected for that virtual node data type, software version, device type and/or the like as described above. In the example of FIG. 11, the processing logic takes virtual node part A from the main node MN, takes another piece of data (part B) from another source such as another node portion, mutates data (whether from part A or part B according to the rules, e.g., the mutated rating replaces Part A's rating), and generates the resultant virtual node VN. As can be readily appreciated, any number of data sources other than the main node may be a source of a virtual node's data, and any number of mutations may be made to the data of either the main node, any external source, or both. Note also that the reference to the main node may be mutated or otherwise replaced, as long as the requestor understands that a request for a data item may result (at least initially) in a modified, virtual data item.

As can be seen, there is described a technology for modifying the data returned to a client requestor to a virtual set of data, while generally maintaining the data as a full set. For a graph-based system, for certain types of nodes a virtual graph node is processed at the data service from the data of a (main) graph node, so that the virtual graph node may be quickly returned to the client, and processed at the client. The main graph node is otherwise maintained as a unit at the data service level.

One or more aspects are directed towards receiving a request for a data item, the data item identified by a data item identifier and an indication that the data item is requested to be returned as a virtual node. Aspects include determining from the data item identifier and the indication that the data item corresponds to a main node that has a corresponding virtual node, obtaining the main node, processing the main node into the virtual node, wherein the virtual node comprises modified data relative to the data of the main node, and returning the virtual node in response to the request, in which the virtual node references the main node.

Processing the main node into the virtual node may comprise removing some of the data from the main node. Processing the main node into the virtual node may comprise removing data from the main node, mutating data, or adding data to the virtual node from a source other than the main node, or any combination of removing data from the main node, mutating data, or adding data to the virtual node from a source other than the main node.

The main node may be obtained by accessing the main node from a data service cache. The main node may be obtained by obtaining sub-parts from one or more backing data stores, and assembling the sub-parts into the main node. The main node may be cached at a data service cache. Upon receiving a request for the main node, the main node may be returned from the data service cache.

Determining from the data item identifier and the indication that the data item corresponds to a main node that has a corresponding virtual node may include detecting node type information encoded in association with the data item identifier.

The request for the virtual node may be expanded into an expanded request that includes the virtual node and the main node. Another virtual node may be requested, with a main node returned, instead of the other virtual node, in response to the request.

Returning the virtual node based upon the main node may include locating a rule set corresponding to a device code and data item type, and applying the rule set to modify some of the data from the main node to generate the virtual node. Locating the rule set may include matching the identifier of the data item against a set of regular expressions that comprise the rules. The request may be associated with a token, with the device code obtained based upon information in the token. The rule set may be maintained as a file system rule set file; locating the rule set corresponding to the device code and the data item type may include using information based upon the identifier of the data item to determine a filename, and using information based upon the device code to determine a set of one or more file system folders for locating the rule set file.

One or more aspects are directed towards a data service that includes a request handler coupled to virtual node processing logic that processes a main node into a virtual node. The request handler recognizes a client request for a virtual node received at the data service, and obtains a main node corresponding to the request. The request handler invokes the virtual node processing logic to generate the virtual node from the main node, and returns the virtual node in response to the request.

Described herein is a data service cache set, wherein the request handler may obtain the main node from the cache set. The data service may include a front-end part and a back-end part, in which the request handler is incorporated into the front-end part and obtains the main node from the back-end part. The request handler may obtain a virtual node rule set based upon node type information and client device-specific information, in which the virtual node processing logic generates the virtual node from the main node based upon the virtual node rule set.

One or more aspects are directed towards receiving a request for a node, determining that the node has a corresponding virtual node and obtaining the node. Aspects include processing the node into the virtual node, including applying a rule set to remove at least some data from the node, and returning the virtual node in response to the request.

Determining that the node has a corresponding virtual node may include detecting an indicator associated with an identifier of the node. The rule set may be located by locating a rule set file based at least in part upon an identifier of the node.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 12 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 12:
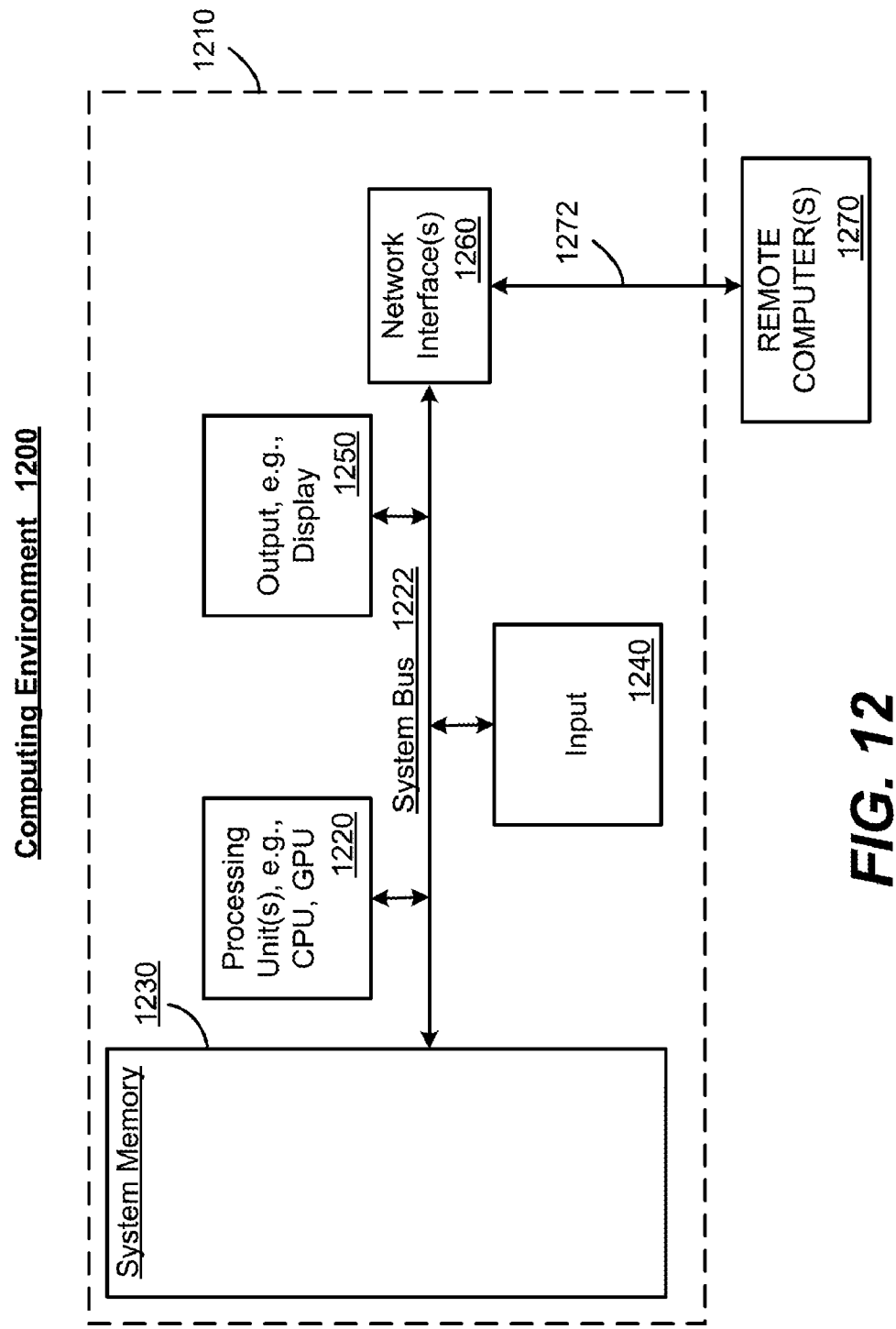
FIG. 12 is a block diagram representing an example computing environment into which aspects of the subject matter described herein may be incorporated.

FIG. 12 thus illustrates an example of a suitable computing system environment 1200 in which one or aspects of the implementations described herein can be implemented, although as made clear above, the computing system environment 1200 is only one example of a suitable computing environment and is not intended to suggest any limitation as to scope of use or functionality. In addition, the computing system environment 1200 is not intended to be interpreted as having any dependency relating to any one or combination of components illustrated in the example computing system environment 1200.

With reference to FIG. 12, an example device for implementing one or more implementations includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of machine (e.g., computer) readable media and can be any available media that can be accessed by a machine such as the computer 1210. The system memory 1230 may include computer storage media in the form of volatile and/or nonvolatile memory such as read only memory (ROM) and/or random access memory (RAM), and hard drive media, optical storage media, flash media, and so forth. By way of example, and not limitation, system memory 1230 may also include an operating system, application programs, other program modules, and program data.

A user can enter commands and information into the computer 1210 through one or more input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
    receiving, by a system operatively coupled to a processor, a request from a device for a data item of a plurality of data items, the data items representing selectable content maintained by the system, wherein the request comprises an identifier for the data item and an indicator that indicates a subset comprising rendering-related data is to be returned instead of the data item;
    determining, by the system based on the request, including based on recognition of the indicator in the request, that the subset of the data item, comprising rendering-related data included in a visual representation of the data item, is to be returned instead of the data item;
    based on the determining, extracting by the system, the rendering-related data from the data item to generate the subset; and
    returning, by the system, the subset instead of the data item to the device.

2. The method of claim 1, further comprising accessing, by the system, the data item from a data service cache, and wherein the extracting further comprises extracting the rendering-related data from the data service cache.

3. The method of claim 1, further comprising, based on the determining, retrieving, by the system, the data item from a data store, and caching, by the system, the data item at a data service cache.

4. The method of claim 1, wherein the request comprises a first request and the subset comprises a first subset, and further comprising receiving, by the system, a second request for a second subset of the data item, and returning, by the system, data item instead of the second subset in response to the receiving the second request.

5. The method of claim 1, wherein the extracting comprises locating a rule set corresponding to a device code and a data item type associated with the data item based on the identifier for the data item included in the request, and applying the rule set to select the data included in the subset from the data item.

6. The method of claim 5, wherein the locating the rule set comprises matching the identifier against a set of regular expressions.

7. The method of claim 5, wherein the request is associated with a token, and further comprising obtaining, by the system, the device code based on information in the token.

8. The method of claim 5, wherein the rule set is maintained as a file system rule set file, and wherein the locating comprises determining, by the system a filename associated with the rule set based on the identifier and determining, by the system, a set of one or more file system folders for locating the rule set file based on the device code.

9. The method of claim 1, wherein the receiving comprises receiving the request in association with selection of the data item via a graphical user interface rendered at the device.

10. The method of claim 1, wherein the subset corresponds to an interactive graphical tile providing the visual representation of the data item for rendering via a graphical user interface at the device.

11. The method of claim 1, wherein the data item corresponds to a node of a graph comprising a plurality of nodes connected via one or more edges and wherein the subset of data corresponds to a virtual node for the node.

12. A system, comprising:
a memory that stores computer executable components;
a processor that executes the computer executable components stored in the memory, wherein the computer executable components comprise:
a request handler that receives a request from a device, the request identifying a main node from among a graph of nodes representing data items of selectable content, the request comprising an indication that the device is requesting a virtual node associated with the main node, wherein the main node corresponds to a data item and the virtual node corresponds to a portion of the data item comprising data included in a visual representation of the data item, and wherein the virtual node comprises reference information linking the virtual node to the main node; and
a virtual node processing logic that generates the virtual node from the main node based on the indication and returns the virtual node to the device instead of the main node in response to the request.

13. The system of claim 12, further comprising a data service cache, wherein the request handler obtains the main node from the data service cache to generate the virtual node from the main node.

14. The system of claim 12, further comprising a data store that stores the graph of nodes including the main node, wherein the request handler retrieves the main node from the data store to generate the virtual node from the main node.

15. One or more non-transitory machine-readable storage media having machine-executable instructions, which when executed perform operations, the operations comprising:
receiving a request from a device for a data item represented by a node of a node graph;
determining that the node is associated with a virtual node that corresponds to a portion of the data item, the portion comprising data included in a visual representation of the data item;
separating the data from the data item to generate the virtual node, wherein the virtual node comprises reference information linking the virtual node to the main node; and
returning the virtual node to the device instead of the node in response to the request.

16. The one or more non-transitory machine-readable storage media of claim 15, wherein the determining comprises detecting an indicator associated with an identifier of the node included in the request, wherein the indicator indicates the device prefers the virtual node over the node.

17. The one or more non-transitory machine-readable storage media of claim 15, wherein virtual node corresponds to an interactive graphical tile providing the visual representation of the data item for rendering via a graphical user interface at the device.

18. A method comprising:
receiving, by a system operatively coupled to a processor, a request from a device for a dataset of a plurality of data items;
determining, by the system based on the request, that a subset of the data item comprising rendering-related data included in a visual representation of the data item is to be returned instead of the data item;
based on the determining, extracting by the system, the data from the data item to generate the subset, wherein the extracting comprises locating a rule set corresponding to a device code and a data item type associated with the data item based on an identifier for the data item included in the request, and applying the rule set to select the data included in the subset from the data item; and
returning, by the system, the subset instead of the data item to the device.

19. The method of claim 18, wherein the locating the rule set comprises matching the identifier against a set of regular expressions.

20. The method of claim 18, wherein the request is associated with a token, and further comprising obtaining, by the system, the device code based on information in the token.

21. The method of claim 18, wherein the rule set is maintained as a file system rule set file, and wherein the locating comprises determining, by the system a filename associated with the rule set based on the identifier, and determining, by the system, a set of one or more file system folders for locating the rule set file based on the device code.

* * * * *